US011222162B2

(12) United States Patent
Rochiramani et al.

(10) Patent No.: US 11,222,162 B2
(45) Date of Patent: Jan. 11, 2022

(54) MANAGING CONTENT ITEM COLLECTIONS

(71) Applicant: Dropbox, Inc., San Francisco, CA (US)

(72) Inventors: Sunny Rochiramani, San Francisco, CA (US); Vinod Valloppillil, Berkeley, CA (US); Jacob Hurwitz, San Francisco, CA (US); Katherine R. Rudolph, San Francisco, CA (US); Francesco Paduano, San Francisco, CA (US); Eric Sprauve, San Francisco, CA (US); Igor Kofman, San Francisco, CA (US); Aaron Staley, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 56 days.

(21) Appl. No.: 16/119,226

(22) Filed: Aug. 31, 2018

(65) Prior Publication Data
US 2019/0102364 A1 Apr. 4, 2019

Related U.S. Application Data

(63) Continuation-in-part of application No. 15/721,158, filed on Sep. 29, 2017, now Pat. No. 10,592,595.
(Continued)

(51) Int. Cl.
*G06F 40/106* (2020.01)
*G06F 3/0486* (2013.01)
(Continued)

(52) U.S. Cl.
CPC .......... *G06F 40/106* (2020.01); *G06F 3/0486* (2013.01); *G06F 16/26* (2019.01);
(Continued)

(58) Field of Classification Search
CPC .... G06F 40/106; G06F 40/131; G06F 40/166; G06F 40/169; G06F 16/26; G06F 3/0486;
(Continued)

(56) References Cited

U.S. PATENT DOCUMENTS 5,883,986 A 3/1999 Kopec et al.
6,266,683 B1 7/2001 Yehuda et al.
(Continued)

FOREIGN PATENT DOCUMENTS

JP 2002091818 3/2002
JP 2005129018 5/2005
(Continued)

OTHER PUBLICATIONS

Notice of Allowance from U.S. Appl. No. 15/721,158, dated Nov. 7, 2019, 14 pages.
(Continued)

*Primary Examiner* — Daniel Samwel
(74) *Attorney, Agent, or Firm* — Dla Piper LLP (US)

(57) ABSTRACT

Disclosed are systems, methods, and non-transitory computer-readable storage media for managing content item collections. For example, in embodiment, a client device may receive first user input selecting a content item collection. The client device may generate a graphical user interface for presenting the content item collection. The content item collection may include one or more tiles. Each tile may correspond to a content item embedded into the content item collection and stored by a content management system. The client device may present the content item collection including the one or more tiles. The client device may present, within each of the one or more tiles, an image representing the corresponding content item.

21 Claims, 18 Drawing Sheets

Related U.S. Application Data

(60) Provisional application No. 62/573,099, filed on Oct. 16, 2017.

(51) Int. Cl.
*G06F 16/26* (2019.01)
*H04L 29/06* (2006.01)
*G06F 40/131* (2020.01)
*G06F 40/166* (2020.01)
*G06F 40/169* (2020.01)

(52) U.S. Cl.
CPC .......... *G06F 40/131* (2020.01); *G06F 40/166* (2020.01); *G06F 40/169* (2020.01); *H04L 63/105* (2013.01); *H04L 63/0428* (2013.01); *H04L 63/0435* (2013.01); *H04L 63/10* (2013.01)

(58) Field of Classification Search
CPC ............... H04L 63/105; H04L 63/0428; H04L 63/0435; H04L 63/10
See application file for complete search history.

(56) References Cited

U.S. PATENT DOCUMENTS

| | | | |
|---|---|---|---|
| 6,675,355 B1 | 1/2004 | Demopoulos et al. | |
| 6,807,632 B1* | 10/2004 | Carpentier | H04L 12/1854 713/165 |
| 7,496,886 B2 | 2/2009 | Puttaswamy et al. | |
| 8,380,796 B2 | 2/2013 | Robertson et al. | |
| 8,498,994 B2 | 7/2013 | Prabaker et al. | |
| 8,826,147 B2 | 9/2014 | Sitrick et al. | |
| 8,856,132 B2 | 10/2014 | Harischandrakar et al. | |
| 9,087,320 B2 | 7/2015 | Goldman et al. | |
| 9,189,756 B2 | 11/2015 | Gilbert et al. | |
| 9,189,770 B2 | 11/2015 | Greene et al. | |
| 9,275,161 B2 | 3/2016 | Kass et al. | |
| 9,531,652 B2 | 12/2016 | Debenedictis et al. | |
| 2005/0198584 A1* | 9/2005 | Matthews | G06F 9/44505 715/779 |
| 2006/0050312 A1 | 3/2006 | Takiyama et al. | |
| 2006/0085477 A1 | 4/2006 | Phillips et al. | |
| 2006/0193518 A1 | 8/2006 | Dong et al. | |
| 2007/0162432 A1 | 7/2007 | Armstrong et al. | |
| 2008/0005235 A1 | 1/2008 | Hegde et al. | |
| 2008/0189399 A1 | 8/2008 | Quoc et al. | |
| 2009/0259441 A1 | 10/2009 | Yoshikai et al. | |
| 2009/0327305 A1 | 12/2009 | Roberts et al. | |
| 2011/0035323 A1 | 2/2011 | Hamilton et al. | |
| 2011/0047484 A1 | 2/2011 | Mount et al. | |
| 2011/0078191 A1 | 3/2011 | Ragnet et al. | |
| 2011/0208822 A1 | 8/2011 | Rathod | |
| 2011/0246869 A1 | 10/2011 | Vion-Dury | |
| 2011/0296507 A1* | 12/2011 | Khosrowshahi | G06F 40/166 726/7 |
| 2012/0063367 A1 | 3/2012 | Curtis et al. | |
| 2012/0110445 A1 | 5/2012 | Greenspan et al. | |
| 2012/0192086 A1 | 7/2012 | Ghods et al. | |
| 2012/0221383 A1* | 8/2012 | Shore | G11B 27/034 705/14.1 |
| 2013/0036369 A1 | 2/2013 | Mitchell et al. | |
| 2013/0185252 A1 | 7/2013 | Palmucci | |
| 2013/0246901 A1 | 9/2013 | Massand | |
| 2013/0262420 A1 | 10/2013 | Edelstein et al. | |
| 2013/0275525 A1* | 10/2013 | Molina | H04L 51/12 709/206 |
| 2013/0311597 A1* | 11/2013 | Arrouye | G06F 9/5072 709/217 |
| 2014/0055400 A1 | 2/2014 | Reuschel | |
| 2014/0089306 A1 | 3/2014 | Rana et al. | |
| 2014/0164255 A1 | 6/2014 | Daly et al. | |
| 2014/0229854 A1* | 8/2014 | Caine | H04L 51/08 715/752 |
| 2014/0258350 A1 | 9/2014 | Duval et al. | |
| 2014/0258915 A1* | 9/2014 | Lakra | G06F 16/34 715/781 |
| 2014/0280463 A1 | 9/2014 | Hunter et al. | |
| 2014/0282166 A1* | 9/2014 | Temkin | G06Q 10/10 715/769 |
| 2014/0331126 A1 | 11/2014 | Hunter et al. | |
| 2015/0007055 A1 | 1/2015 | Lemus et al. | |
| 2015/0149329 A1* | 5/2015 | Tam | G06Q 30/0643 705/27.2 |
| 2015/0199411 A1 | 7/2015 | Greenspan et al. | |
| 2015/0324381 A1 | 11/2015 | Brand et al. | |
| 2016/0055532 A1* | 2/2016 | Connolly | G06Q 30/0257 705/14.55 |
| 2016/0057154 A1 | 2/2016 | Ferguson et al. | |
| 2016/0063321 A1 | 3/2016 | Reese et al. | |
| 2016/0110403 A1 | 4/2016 | Lomet et al. | |
| 2016/0191997 A1* | 6/2016 | Eklund | H04N 21/440281 725/59 |
| 2016/0259508 A1 | 9/2016 | Eccleston et al. | |
| 2016/0314318 A1 | 10/2016 | Li et al. | |
| 2017/0090704 A1 | 3/2017 | Hu et al. | |
| 2017/0139550 A1 | 5/2017 | Milvaney et al. | |
| 2017/0177182 A1 | 6/2017 | Wong et al. | |
| 2017/0177965 A1 | 6/2017 | Gordo et al. | |
| 2017/0235436 A1* | 8/2017 | Hooton | G06F 3/0482 705/7.11 |
| 2017/0242556 A1* | 8/2017 | Al-Jallad | G06F 3/0482 |
| 2017/0285889 A1* | 10/2017 | DeMaris | G06F 16/176 |
| 2019/0012053 A1* | 1/2019 | Hawa | G06F 9/541 |

FOREIGN PATENT DOCUMENTS

| | | |
|---|---|---|
| JP | 2007213467 A | 8/2007 |
| JP | 2009080829 A | 4/2009 |
| JP | 2010033470 A | 2/2010 |
| JP | 2016500187 A | 1/2016 |
| JP | 2016224977 A | 12/2016 |
| WO | 2014/100782 | 6/2014 |

OTHER PUBLICATIONS

Garfinkel, "Automating Disk Forensic Processing with SleuthKit, XML, and Python", Systematic Approaches to Digital Forensic Engineering, May 21, 2009, SADFE '09, Fourth International IEEE Workshop, 2 pages.

Aionaaka, "Calhoun: The NPS Institutional Archive DSpace Repository Motivating language and empathic leadership drives aircraft readiness", Mar. 2017, 59 pages.

International Search Report and Written Opinion for PCT Application No. PCT/US2018/048011 dated Jul. 11, 2018, 11 pages.

Bijalwan D.C., et al., "Automatic Text Recognition in Natural Scene and its Translation into User Defined Language," 2014 International Conference on Parallel, Distributed and Grid Computing (PDGC), IEEE, Dec. 11, 2014, pp. 324-329.

Fleishman G., "Best Online Storage Services for Small Businesses," PCWorld, Apr. 12, 2011, retrieved from http://www.pcworld.com/article/224905/online_storage_for_businesses.html on Aug. 19, 2014, 3 pages.

Herlihy M.P., et al., "Linearizability: A Correctness Condition for Concurrent Objects," ACM Transactions on Programming Languages and Systems, vol. 12 (3), Jul. 1990, pp. 463-492.

International Search Report and Written Opinion for PCT Application No. PCT/US2014/039707 dated Oct. 9, 2014, 13 pages.

Kaur D., et al., "Machine Printed Gurumukhi Numerals Recognition using Convolutional Neural Networks," International Research Journal of Engineering and Technology (IRJET), vol. 3 (8), Aug. 2016, pp. 555-558.

Pellicer J.P., "Neural Networks for Document Image and Text Processing," Neural Networks for Document Image and Text Processing, Sep. 2017, 327 pages.

Ryan, "What are Collaboration Folders and How do I use them?," Aug. 15, 2011, Support.box.com, retrieved from https://web.archive.

(56) References Cited

OTHER PUBLICATIONS org/web/20130425025610/https://support.box.com/entries/20358617-What-are-Collaboration-Folders-and-how-do-I-use-them-, Sep. 15, 2014, 1 page.

Sabbir A., et al., "Concurrency Control Frameworks for Interactive Sharing of Data Spaces in Real-time Distributed Collaborations," DS-RT'05, Proceedings of the 2005 Ninth IEEE International Symposium on Distributed Simulation and Real-Time Applications Electrical Contacts, 2005, 9 pages.

SugarSync, "Sharing a Folder," XP002728686, retrieved from: https://web.archive.org/web/20120504090157/http://www.sugarsync.com/online-help/Sharing_Folders.htm, Aug. 19, 2014, 1 page.

Van Renesse R., et al., "Chain Replication for Supporting High Throughput and Availability," USENIX Association, OSDI'04, 6th Symposium on Operating Systems Design and Implementation, 2004, pp. 91-104.

Notice of Allowance from U.S. Appl. No. 16/052,178, dated Aug. 27, 2020, 6 pages.

Non-Final Office Action from U.S. Appl. No. 16/052,178, dated Mar. 12, 2020, 7 pages.

International Appl. No. PCT/US2018/048011, International Preliminary Report on Patentability dated Apr. 9, 2020, 9 pages.

Communication Pursuant to Rules 161(1) and 162 EPC for European Application No. 18766102.0 dated May 8, 2020, 3 pages.

Examination Report No. 1, for Australian Application No. 2018342118, dated Jul. 3, 2020, 5 pages.

Notice of Acceptance for Australian Application No. 20180342118 dated Oct. 29, 2020, 3 pages.

Notice of Allowance from U.S. Appl. No. 16/052,178, dated Nov. 19, 2020, 3 pages.

Notice of Allowance from U.S. Appl. No. 16/052,178, dated Oct. 7, 2020, 5 pages.

Notification of Reason(s) for Refusal for Japanese Application No. 2019-559784 dated Nov. 9, 2020, 10 pages.

Communication Pursuant to Article 94(3) EPC for European Application No. 18766102.0 dated Jun. 10, 2021, 7 pages.

\* cited by examiner

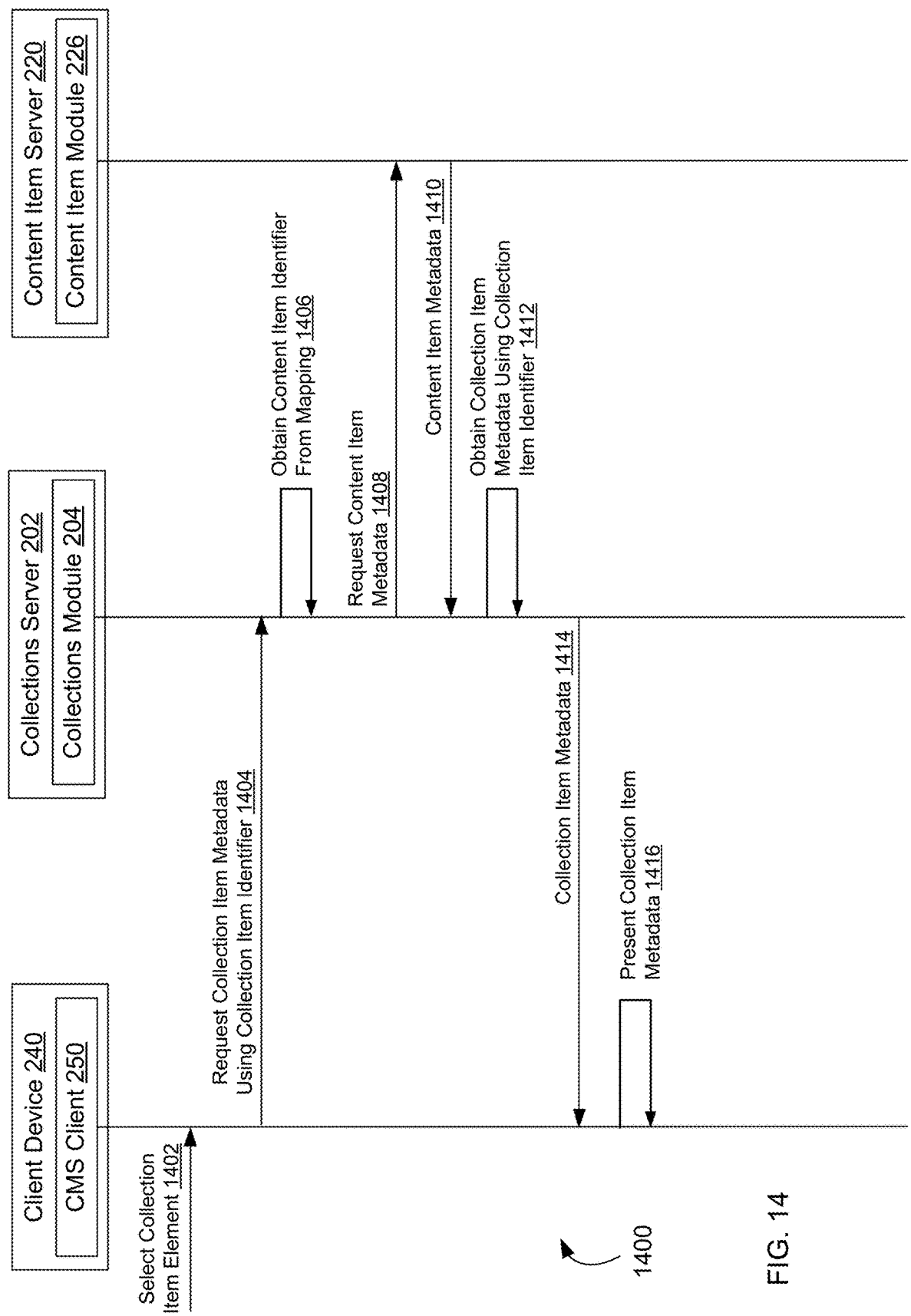

MANAGING CONTENT ITEM COLLECTIONS

CROSS-REFERENCE TO RELATED APPLICATIONS

This application is a continuation-in-part of U.S. application Ser. No. 15/721,158, filed Sep. 29, 2017, which claims priority to U.S. Application Ser. No. 62/573,099, filed Oct. 16, 2017, which are hereby incorporated by reference in their entireties.

BACKGROUND

Generating high quality interactive media presentations that have a polished look can be difficult. A mechanism for managing content and presenting the content in an organized and aesthetically pleasing way without exposing unfinished work product (e.g., comments, edits, other metadata, etc.) is needed.

SUMMARY

Additional features and advantages of the disclosure will be set forth in the description which follows, and in part will be apparent from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for managing content item collections. For example, in embodiment, a content management system receives a first request to generate a content item collection. The content management system generates the content item collection comprising one or more tiles. Each tile of the one or more tiles corresponds to a content item stored by the content management system. The content management system transmits the content item collection comprising the one or more tiles to a client device for display. The content management system receives a second request selecting a first content item to insert in a first tile of the content item collection. The content management system generates a preview of at least a portion of the first content item. The content management system associates the preview of at least the portion of the first content item with the first tile of the content item collection. The content management system generates an updated content item collection comprising at least the first tile and the preview of at least the portion of the first content item. The content management system transmits the updated content item collection to the client device for display.

In another embodiment, a client device receives a first user input corresponding to a request to generate a content item collection. The client device transmits the request for the content item collection to a collections server. The client device receives, from the collections server, the content item collection comprising one or more tiles. Each tile of the one or more tiles corresponds to a content item stored by a content management system. The client device generates a first graphical user interface for presenting the content item collection comprising the one or more tiles. The client device receives, via the first graphical user interface, a second user input corresponding to a request to add a first content item to a first tile of the one or more tiles. The client device transmits the request to add the first content item to the first tile to the content management system. The client device receives from the content management system an updated content item collection comprising a preview of at least a portion of the first content item and the first tile of the one or more tiles. The client device generates a second graphical user interface for presenting the updated content item collection. The second graphical user interface includes the preview image positioned in the first tile.

In another embodiment, a non-transitory computer readable medium is disclosed herein. The non-transitory computer readable medium stores instructions, which, when executed by one or more processors, cause the one or more processors to perform operations. The operations include receiving a first user input corresponding to a request to generate a content item collection. The operations include transmitting the request for the content item collection to a collections server. The operations include receiving, from a content management system, the content item collection comprising one or more tiles. Each tile of the one or more tiles corresponding to a content item stored by the content management system. The operations include generating a first graphical user interface for presenting the content item collection comprising the one or more tiles. The operations include receiving, via the first graphical user interface, a second user input corresponding to a request to add a first content item to a first tile of the one or more tiles. The operations include transmitting the request to add the first content item to the first tile to the content management system. The operations include receiving, from the content management system, an updated content item collection comprising a preview of at least a portion of the first content item and the first tile of the one or more tiles. The operations include generating a second graphical user interface for presenting the updated content item collection. The second graphical user interface includes the preview image positioned in the first tile.

BRIEF DESCRIPTION OF THE DRAWINGS

The above-recited and other advantages and features of the disclosure will become apparent by reference to specific embodiments thereof which are illustrated in the appended drawings. Understanding that these drawings depict only example embodiments of the disclosure and are not therefore to be considered to be limiting of its scope, the principles herein are described and explained with additional specificity and detail through the use of the accompanying drawings in which:

FIG. 14 shows a flow diagram of an example process for presenting collection item metadata;

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional and/or alternative details and/or implementations of the technology disclosed herein can be found in U.S. patent application Ser. No. 15/721,158, titled "MAINTAINING MULTIPLE VERSIONS OF A COLLECTION OF CONTENT ITEMS," which is hereby incorporated by reference in its entirety.

The disclosed technology addresses the need in the art for presenting a collection of content items while preventing end users from directly accessing the content items and/or content item metadata.

Figure 1A:
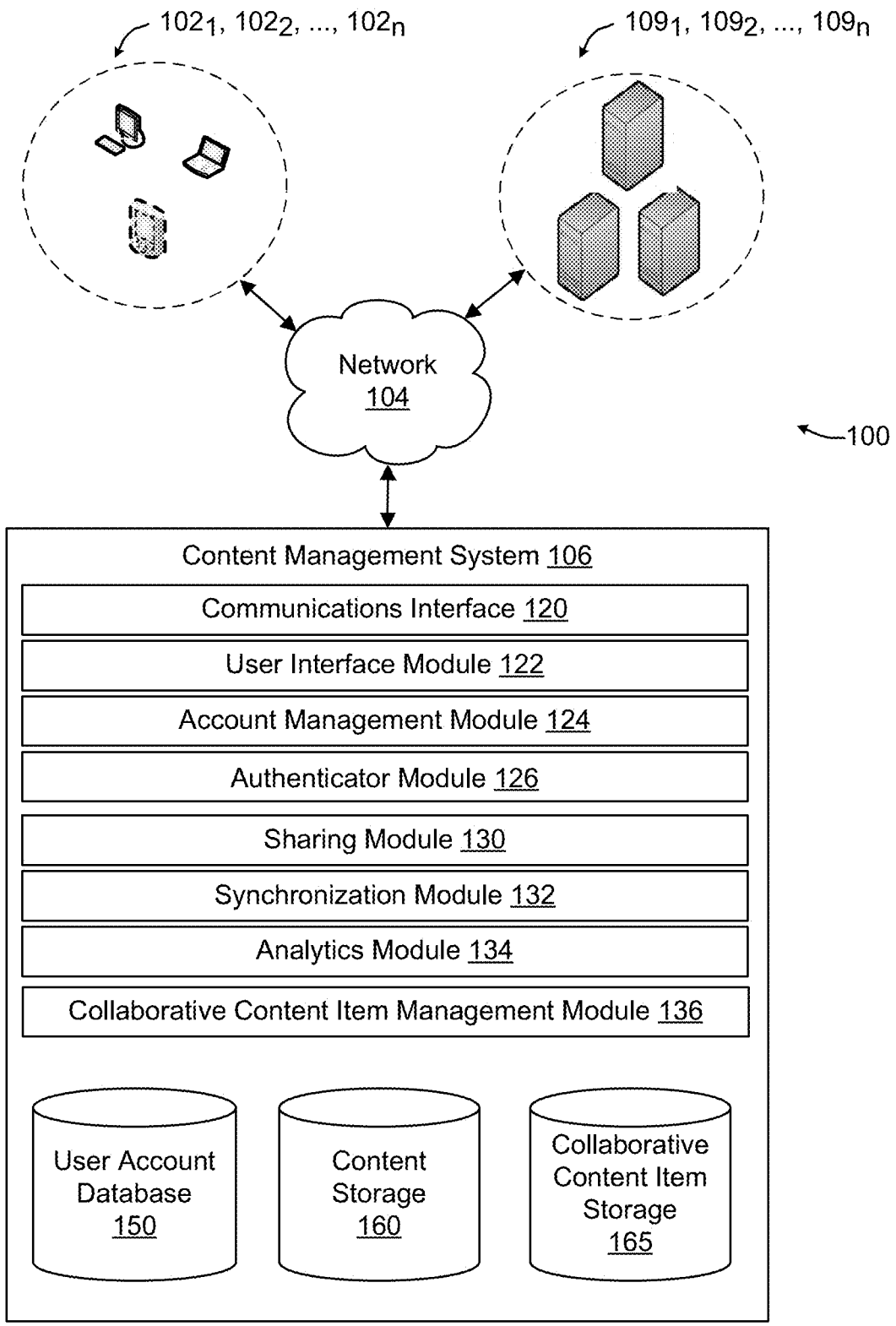
FIG. 1A shows an example configuration of devices and a network in accordance with some embodiments.

With respect to implementing various embodiments of the disclosed technology, an example system configuration 100 is shown in FIG. 1A, wherein electronic devices communicate via a network for purposes of exchanging content and other data. The system can be configured for use on a wide area network such as that illustrated in FIG. 1A. However, the present principles are applicable to a wide variety of network configurations that facilitate the intercommunication of electronic devices. For example, each of the components of system 100 in FIG. 1A can be implemented in a localized or distributed fashion in a network.

In system 100, a user (e.g., an individual, group of users, company, etc.) can interact with content management system 106 (e.g., an online synchronized content management system) through client devices $102_1$, $102_2$, ..., $102_n$ (collectively "102") connected to network 104 by direct and/or indirect communication. Content management system 106 can include a single computing device (e.g., a server) or multiple computing devices (e.g., multiple servers) that are configured to perform the functions and/or operations necessary to provide the services described herein. Content management system 106 can support connections from a variety of different client devices, such as: desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 via a client-side application installed on client device $102_i$. In some embodiments, the client-side application can include a content management system specific component. For example, the component can be a stand-alone application, one or more application plug-ins, and/or a browser extension. However, the user can also interact with content management system 106 via a third-party application, such as a web browser, that resides on client device $102_i$ and is configured to communicate with content management system 106. In either case, the client-side application can present a user interface (UI) for the user to interact with content management system 106. For example, the user can interact with the content management system 106 via a client-side application integrated with the file system or via a webpage displayed using a web browser application.

Content management system 106 can enable a user to store content items, as well as perform a variety of content management tasks, such as retrieve, modify, browse, and/or share the content items. Furthermore, content management system 106 can enable a user to access the content from multiple client devices 102. For example, client device $102_i$ can upload content to content management system 106 via network 104. Later, the same client device $102_i$ or some other client device $102_j$ can retrieve the content from content management system 106.

To facilitate the various content management services, a user can create an account with content management system 106. User account database 150 can maintain the account information. User account database 150 can store profile information for registered users. In some cases, the only personal information in the user profile can be a username and/or email address. However, content management system 106 can also be configured to accept additional user information such as birthday, address, billing information, etc.

User account database 150 can include account management information, such as account type, usage information, (e.g., file access or edit history), storage space used, content storage locations, security settings, personal configuration settings, content sharing data, etc. Account management module 124 can be configured to update and/or obtain user account details in user account database 150. The account management module 124 can be configured to interact with any number of other modules in content management system 106.

An account can be used to store content items, such as digital data, documents, collaborative content items, text files, audio files, image files, video files, webpages, executable files, binary files, placeholder files that reference other content items, etc., from one or more client devices 102 authorized on the account. The content items can also include collections for grouping content items together with different behaviors, such as folders, playlists, albums, etc. For example, an account can include shared collections or group collections that are linked with and available to multiple user accounts. The permissions for multiple users may be different for a shared collection.

The content items can be stored in content storage 160. Content storage 160 can be a storage device, multiple storage devices, or a server. Alternatively, content storage 160 can be a cloud storage provider or network storage accessible via one or more communications networks. Content management system 106 can hide the complexity and details from client devices 102 so that client devices 102 do not need to know exactly where or how the content items are being stored by content management system 106. In some embodiments, content management system 106 can store the content items in the same collection hierarchy as they appear on client device $102_i$. However, content management system 106 can store the content items in its own order, arrangement, or hierarchy. Content management system 106 can store the content items in a network accessible storage (NAS) device, in a redundant array of independent disks (RAID), etc. Content storage 160 can store content items using one or more partition types, such as FAT, FAT32, NTFS, EXT2, EXT3, EXT4, HFS/HFS+, BTRFS, and so forth.

Content storage 160 can also store metadata describing content items, content item types, and the relationship of content items to various accounts, collections, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate content items or duplicate segments of content items. Instead of storing multiple copies, content storage 160 can store a single copy and then use a pointer or other mechanism to link the duplicates to the single copy. Similarly, content storage 160 can store content items more efficiently, as well as provide the ability to undo operations, by using a content item version control that tracks changes to content items, different versions of content items (including diverging version trees), and a change history. The change history can include a set of changes that, when applied to the original content item version, produce the changed content item version.

Content management system 106 can be configured to support automatic synchronization of content items from one or more client devices 102. The synchronization can be platform agnostic. That is, the content items can be synchronized across multiple client devices 102 of varying type, capabilities, operating systems, etc. For example, client device $102_i$ can include client software, which synchronizes, via a synchronization module 132 at content management system 106, content in client device $102_i$'s file system with the content in an associated user account. In some cases, the client software can synchronize any changes to content in a designated collection and its sub-collections, such as new, deleted, modified, copied, or moved content items or collections. The client software can be a separate software application, can integrate with an existing content management application in the operating system, or can be some combination thereof. In one example of client software that integrates with an existing content management application, a user can manipulate content items directly in a local collection, while a background process monitors the local collection for changes and synchronizes those changes to content management system 106. Conversely, the background process can identify content items that have been updated at content management system 106 and synchronize those changes to the local collection.

A user can view or manipulate content via a web interface generated and served by user interface module 122. For example, the user can navigate in a web browser to a web address provided by content management system 106. Changes or updates to content in the content storage 160 made through the web interface, such as making edits to text or media that are part of the content item, can be propagated to other client devices 102 authorized to access the content item. For example, multiple client devices 102, each with their own client software, can be associated with a single account and content items in the account can be synchronized between each of the multiple client devices 102.

Content management system 106 can include a communications interface 120 for interfacing with various client devices 102, and can interact with other content and/or service providers $109_1$, $109_2$, ..., $109_n$ (collectively "109") via an Application Program Interface (API). Certain software applications can access content storage 160 via an API on behalf of a user. For example, a software package, such as an app running on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access content items. Further, content management system 106 can include analytics module 134 module that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content items. Sharing content items can include making the content item accessible from any computing device in network communication with content management system 106. Sharing content items can also include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some implementations, to share a content item, sharing module 130 can be configured to add a user account identifier to the content entry associated with the content item, thus granting the added user account access to the content item. Sharing module 130 can also be configured to remove user account identifiers from a content entry to restrict a user account's access to the content item.

In some implementations, to share a content item, sharing module 130 can be configured to generate a custom network address, such as a uniform resource locator (URL), which allows web browsers to access the content in content management system 106, which in some implementations, can be allowed without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In some implementations, content management system 106 can include collaborative content item management module 136. Collaborative content item management module 136 can provide an interactive content item collaboration platform whereby users can simultaneously create collaborative content items, comment in the collaborative content items, and manage tasks within the collaborative content items. Collaborative content item management module 136 can be implemented as a separate subsystem of content management system 106. For example, in some implementations, the management of content items, as described above, can be performed by one or more servers of content management system 106 specifically configured to manage content items. The management of collaborative content items can be performed by one or more servers of content management system 106 that are separate from the content item management servers and that are specifically configured to manage collaborative content items. In some implementations, the same servers can be configured to manage both content items and collaborative content items. Similarly, content items and collaborative content items can be both be stored in content storage 160. Alternatively, content storage 160 may store content items while collaborative content items can be stored separately in collaborative content item storage 165.

Collaborative content items can be files that users can create and edit using a collaborative content items editor, and can contain collaborative content item elements. Collaborative content items and/or the data defining collaborative content items can be stored separately from content items. Collaborative content item elements may include a collaborative content item identifier, one or more author identifiers, collaborative content item text, collaborative content item attributes, interaction information, comments, sharing users, etc. Collaborative content item elements can be stored as database entities, which allows for searching and retrieving the collaborative content items. Multiple users may access, view, edit, and collaborate on collaborative content items at the same time or at different times. In some embodiments this can be managed as multiple users access a content item through a web interface and there they can work on the same copy of the content item at the same time.

In some implementations, portions of a collaborative content item can be represented by a list of attributed text (e.g., a string of text where each character or character range has a set of attributes). An attribute can be a (key, value) pair: for example, ("bold", "true"), ("list", "bullet1"), or ("author", authorID). Furthermore, a collaborative content item can be stored as a sequence of change sets. A change set represents an edit to a particular version of a collaborative content item. Applying a change sets can insert and delete characters and apply attributes to ranges. Thus, a given change set can be applied to a particular collaborative content item representation to generate another collaborative content item representation. For example, a collaborative content item representation "abc\n" and a change set "insert d at position 2", which when applied, would yield a collaborative content item representation "abdc\n". Applying all of the change sets, in a given order, to an initial version of a collaborative content item representation, can produce a current version of the collaborative content item comprising a list of attributed text representation. Multiple users may access, view, edit, and collaborate on a collaborative content item at the same time or at different times. In some embodiments this can be managed by providing multiple users with access to a content item through a web interface where they can interact with a same copy of the content item at the same time.

While content management system 106 is presented with specific components, it should be understood by one skilled in the art, that the architectural configuration of system 106 is simply one possible configuration and that other configurations with more or fewer components are possible.

Figure 1B:
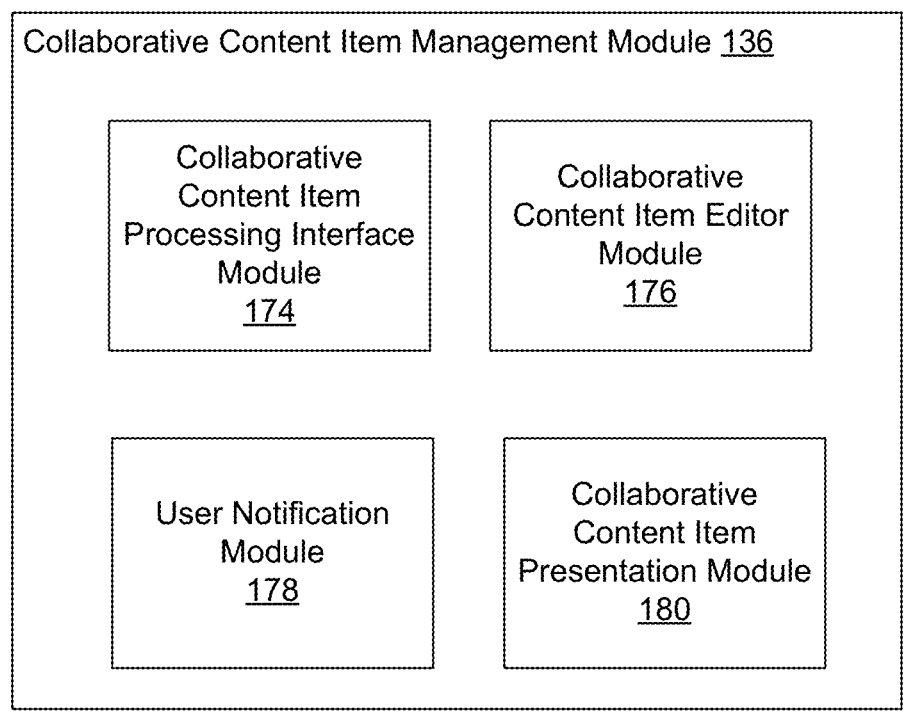
FIG. 1B shows a block diagram of an example system for managing collaborative content items.

FIG. 1B shows an example collaborative content item management module 136, according to some embodiments. Collaborative content item management module 136 may include collaborative content item processing interface module 174, collaborative content item editor module 176, user notification module 178, and/or collaborative content item presentation module 180. One or more of collaborative content item processing interface module 174, collaborative content item editor module 176, user notification module 178, and collaborative content item presentation module 180 may be coupled to one another or to modules not explicitly shown.

Collaborative content item processing interface module 174 may be configured to interface with collaborative content item management module 136. In various embodiments, collaborative content item processing interface module 174 may provide collaborative content items to one or more modules of collaborative content item management module 136, as described further herein.

Collaborative content item editor module 176 may be configured to create and/or modify collaborative content items. A collaborative content item may be created in a variety of ways. In some embodiments, collaborative content item editor module 176 enables creation of the collaborative content item into the content management system 106. Collaborative content item editor module 176 may enable access to or be any collaborative content item editing application (e.g., Microsoft Word®, Google Docs®, or the like) either in the cloud or executed locally. In one example, content management system 106 may provide to one of client devices 120 a user interface element (e.g., a box or a button) that allows creation of a new collaborative content item.

Once the user requests to create or invoke the collaborative content item, collaborative content item editor module 176 may create and/or invoke a collaborative content item. The collaborative content item may be subsequently edited, altered, viewed, changed, stored, and/or the like by an editing application (e.g., either stored locally on a client device 102 or in the cloud). In various embodiments, one or more different client devices 120 may utilize different editing applications to make changes to the collaborative content item. Collaborative content item editor module 176 and/or other editing applications may allow for the collaborative content item to be changed by multiple different users using different client devices 120 at the same time or substantially at the same time (e.g., in real time or substantially in real time).

Collaborative content item editor module 176 may receive from users additional content for the collaborative content item. For example, collaborative content item editor module 176 may be configured to receive from the client devices 102 changes or edits to the collaborative content item. In various embodiments, the changes may include text, characters strings, or the like. The changes may also include annotations to the collaborative content item, comments to the collaborative content item, files to be attached to the collaborative content item, pictures to be attached to the collaborative content item, links to be attached to the collaborative content item, tasks related to the collaborative content item, or the like that can be incorporated into the collaborative content item. In various embodiments, edits to the collaborative content item are collaborative. For instance, collaborative content item editor module 176 may obtain edits (e.g., text changes and/or additions of audio files, pictures, tables, or the like) from any number of client devices 102 at a given time (or in real time). Collaborative edits may be incorporated in a variety of formats, including formats that provide different text attributes such as colors, fonts, styles, or the like for different users.

In various embodiments, collaborative content item editor module 176 (and or a security or permissions module associated with a server) may establish permissions and/or security for the collaborative content item. For example, collaborative content item editor module 176 may enable event attendees to view and/or make edits to the collaborative content item while others may not have rights to view the collaborative content items and/or make changes. Permissions and/or security may be enforced in any number of ways. However, access to the collaborative content item may, in various embodiments, be provided to attendees of the event or a subset of attendees.

In various embodiments, access to the collaborative content item is limited based on storage access rights. For example, a user with access rights to cloud storage may access, view, and/or make changes to the collaborative content item. In some embodiments, a user with access rights assigned by the content management system 106 may access, view, and/or make changes to the collaborative content item.

User notification module 178 may be configured to notify users of each of the client devices 102 of information related to the state and/or contents of the collaborative content item. Notifications may be sent, for example as an email notification, a chat message notification, a notification in a display of the collaborative content item, or in relation to the collaborative content item through a file system or other organizational system. In various embodiments, user notification module 178 provides notifications about changes to the client devices 102.

Collaborative content item presentation module 180 may provide to the client devices 102 selected collaborative content items. The collaborative content items may be displayed in the client devices 102 through a native application, an Internet browsing window, or the like supported by the client devices 120 . . . .

It will be appreciated that collaborative content item presentation module 180 may restrict writing permissions to the collaborative content items at any time. In an example, prior to occurrence of the event, collaborative content item presentation module 180 may restrict writing permissions to the collaborative content item (and turn the collaborative content item into a read-only collaborative content item) for all users except the creator or invoker of the collaborative content item. In some embodiments, the creator or invoker of the collaborative content item may select a subset of recipients to receive writing permissions.

Collaborative content item presentation module 180 may also support a collaborative content item viewing portal users can use to view existing collaborative content items. The collaborative content item viewing portal may order specific collaborative content items based on one or more ordering factors. "Ordering factors," as used herein, may include any factors used to order collaborative content items. Ordering factors can include factors used to order collaborative content items chronologically. More specifically, in some embodiments, the collaborative content item viewing portal orders collaborative content items according to the date(s) and/or times the collaborative content items were created. The collaborative content item viewing portal may also order collaborative content items according to the date(s) and/or time(s) the collaborative content items were edited. In various embodiments, the collaborative content item viewing portal orders collaborative content items according to the date(s) and/or time(s) of corresponding events to which the collaborative content items were related. Ordering factors can also include factors used to order collaborative content items according to the preferences of a specific user, such as whether the user has accepted events to which the collaborative content items were related.

In some embodiments, a collaborative content item viewing portal may be dedicated to a particular user who has received access to the collaborative content item because the particular user was related to an event. The user's collaborative content item viewing portal may provide access to any number of collaborative content items including the collaborative content item. The collaborative content items represented in the collaborative content item viewing portal may be ordered in any number of ways. For example, the collaborative content item viewing portal may order collaborative content items based on date and time of corresponding events.

The collaborative content item viewing portal may support search functions. For instance, the collaborative content item viewing portal may enable or allow searching for collaborative content items according to textual strings, titles, event attendees, and/or other attributes. The search functions may allow a specific user to search one or more collaborative content items for that user or for other users.

Figure 2:
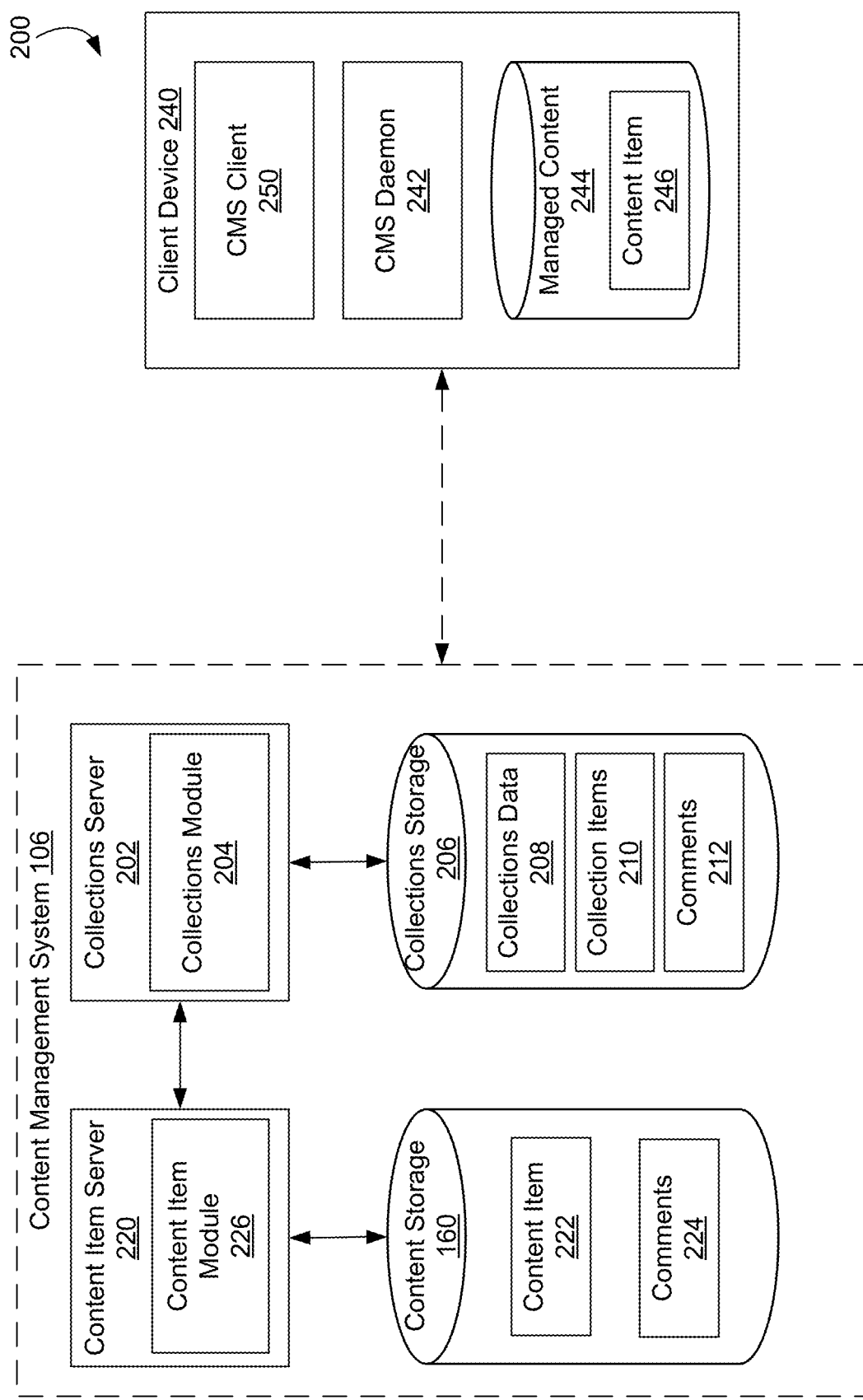
FIG. 2 shows a block diagram of an example system for managing content item collections.

FIG. 2 is a block diagram of an example system 200 for managing content item collections. For example, system 200 can correspond to system 100 of FIG. 1A.

In some implementations, content management system 106 can include collections module 204. For example, collections module 204 can be a standalone software server. Collections module 204 can be a software module that is part of a larger software system or server. Collections module 204 can run on collections server 202 (e.g., a computing device) that can be one of a plurality of servers that correspond to or comprise content management system 106.

In some implementations, collections module 204 can manage collections of content items. For example, a collection can be a collaborative content item, as described above. However, while collaborative content items are usually freeform and relatively unrestricted with respect to content, layout, structure, and appearance, collections are structured collaborative content items that constrain the type of content that can be added to a collection as well as the a layout of the content within the collection. The collection is primarily constructed of embedded content items and content item metadata arranged in a grid of tiles, where each tile includes a single content item and associated metadata. Each tile can include a link to a corresponding content item managed by content item server 220. Thus, collections module 204 can work cooperatively with content item server 220 to store and retrieve content items referenced by each of the tiles in a collection so that the relevant content items can be embedded into the tiles of a collection.

In some implementations, content management system 106 can include collections storage 206. For example, collections storage 206 can be a repository of collections configuration data managed by collections module 204.

Thus, collections storage 206 can store configuration data that defines the layout and content for many different collections.

In some implementations, collections storage 206 can include collections data 208. For example, collections data 208 can be a table or other data structure that stores a mapping of collection identifiers and attribute data for each collection stored in collections storage 206. For example, collections data 208 can include for each collection entry a collection identifier and attributes for the identified collection. The attributes for a collection can include attributes that specify header information for the collection. For example, the header information can include a header background image identifier (e.g., a link or URL to an image representing the collection). The header information can include text corresponding to the title for the collection. The header information can include a logo or other image (e.g., a link or URL to the logo image) that represents a company, entity, user, product, or group associated with the collection.

In some implementations, a collection entry in collections data 208 can include text corresponding to an introductory statement for the collection. For example, the introductory text can be provided by a user responsible for creating or editing the collection. The introductory text can provide an overall description or introduction to the content included in the corresponding collection.

In some implementations, collection storage 206 can include collection items 210. For example, collections items 210 can be a table or other data structure that includes entries corresponding to tiles in a collection. Each entry or record in collections items 210 can correspond to a single tile. Each entry can include data the define the attributes for each tile. For example, a tile entry can include a collection identifier corresponding to the collection in which the tile and/or corresponding content item is embedded. The tile entry can include a collection item identifier that uniquely identifies the tile across all collections managed by collections module 204. The collection item identifier can be used by collections module 204 to determine the order of tiles when presenting a collection. For example, collections module 204 can arrange tiles and/or corresponding content items within a collection according to an order determined based on the collection item identifier. A tile with a collection item identifier of one, for example, can be presented in a top row at the left most position within a collection. A tile with a collection identifier of two can be presented in the top row at a middle position within the collection. Collections module 204 can continue rendering the collection display (e.g., graphical user interface, web page, etc.) by row by row, top to bottom and left to right until each tile and/or corresponding content item is embedded into the collection display.

The tile entry can include an identifier that identifies the content item embedded in or linked to the corresponding tile. The content item identifier can be, for example, a uniform resource locator (URL) that can be used to obtain metadata for the content item from content item server 220. For example, when embedding content item metadata into a tile of a collection, collections module 204 can insert a URL that includes the corresponding collection item identifier for the tile. When a client (e.g., CMS client 250) needs to obtain metadata for the content item embedded in the tile, the client can use the URL to request the metadata for the tile from collections module 204. Collections module 204 can then use the collection item identifier to content item identifier mapping in collection items 210 to obtain the content item identifier (e.g., URL) corresponding to the collection item identifier. Collections module 204 can then request the metadata for the corresponding content item from content item module 226 on content item server 220 using the content item identifier. For example, content item module 226 provides content item management and represents one or more of the modules 120, 122, 124, 126, 130, 132 and/or 124 described above with reference to FIG. 1A. Collections module 204 can then filter the content item metadata to remove certain metadata (e.g., content item comments) that should not be presented by the client and send the filtered metadata to the client for presentation to the user. Thus, by avoiding sending the content item identifier to the client, collections module 204 can prevent the client from directly accessing the content item metadata stored in content storage 160 and can restrict the client's access to content item metadata.

The tile entry can include a protected shared link (PSL) that can be used by a client to obtain the content item (e.g., an image representing the content item) corresponding to the tile entry from content item server 220. For example, a protected shared link can be an encrypted payload of data that can be used by a client (e.g., CMS client 250) to obtain a content item (e.g., content item image) without allowing the client direct access to the content item identifier and/or the content item stored in content storage 160. For example, the payload can include an identifier (e.g., URL) for the content item (e.g., content item 222) stored in content storage 160. The payload can include a collection identifier. The payload can include a creation time and a time to live duration. For example, the creation time and time to live duration can be used to specify a window of time during which the corresponding PSL is valid. Collections module 204 can encrypt the payload using a shared secret shared by collections module 204 and content item module 226. Collections module 204 can then generate a link (e.g., URL) that includes the encrypted payload and embed the link in the corresponding tile in a collection. By encrypting the content item identifier, collections module 204 can prevent the client from directly accessing the corresponding content item through content item module 226.

When the client needs to obtain the content item from content item module 226, the client can send the encrypted payload to content item module 226. Content item module 226 can then validated the encrypted payload by decrypting the payload using the shared secret and confirming that the current time is within the time window specified in the payload. After validating the payload, content item module 226 can use the content item identifier in the payload to obtain the identified content item from content storage 160. Content item module 226 can generate an image (e.g., a tile image, thumbnail image, full preview image, etc.) corresponding to the content item and send the content item image to the client. The client can then present the content item image in the corresponding tile of the collection.

The tile entry can include comment thread identifiers and/or comment identifiers that can be used to identify and/or obtain collection comments from comments 212. For example, content management system 106 can maintain content item comments (e.g., comments 224) and collection comments (e.g., comments 212) separately. When accessing a content item directly through content module 226 and/or content storage 160, a client may have access to the content item comments 224 managed by content item module 226. However, when accessing a content item through a collection managed by collections module 204, a client is restricted to accessing only the comments 212 associated with the collection and/or tiles within a collection. This restriction is enforced by preventing the client from receiving or otherwise directly accessing the content item identifier, as described above. Thus, a tile entry can include comment thread identifiers and/or comment identifiers that identify comments and/or comment threads stored in comments 212 in collections storage 206. The tile entry can include a caption attribute that stores text describing the corresponding tile and/or content item.

In some implementations, a tile entry can include layout information that describes how a tile should be presented in a collection. For example, the layout information can specify that a tile should be presented in a narrow presentation or a full width presentation. For example, the narrow presentation can present tiles in a smaller format that the full width presentation. The full width presentation can present tiles that span the full width of the collections graphical user interface, as described further below. The layout information can specify the orientation of tile metadata with respect to the tile and/or embedded content item. For example, the metadata orientation can specify that metadata (e.g., title, content item identifier, modified date, comments, and/or other graphical elements should be presented below, to the left, or to the right of the content item embedded in the corresponding tile, as described further below. The layout information can specify a portion of a content item to be presented in a tile. For example, a content item may be larger than the display area provided by a tile. A user can provide input to adjust the content item within the tile so that a specific portion of the content item is presented by the tile. Collections module 204 can store information describing the location of the specific portion of the content item so that the specific portion of the content item can be presented when the tile is displayed.

In some implementations, content management system can include content item server 220. For example, content item server 220 can be one of many servers that comprise content management system 106. Content item server 220 can include content item module 226. As described above, content item module 226 can provide content item management and can represent one or more of the modules 120, 122, 124, 126, 130, 132 and/or 124 described above with reference to FIG. 1A. For example, content item module 226 can manage content item 222 and comments 224 in content storage 160.

In some implementations, system 200 can include client device 240. For example, client device 240 can correspond to client device 102$_i$ described above with reference to FIG. 1A. Client device 240 can be a computing device (e.g., hardware and/or software), such as a laptop computer, desktop computer, tablet computer, smartphone, wearable device or other type of computing device.

In some implementations, client device 240 can include content management system (CMS) daemon 242. For example, CMS daemon 242 can be a background software process (e.g., part of the operating system, standalone process, etc.) that manages, in coordination with content management system 106, synchronization of content items (e.g., content item 246) in managed content 244 with content items (e.g., content item 222) in content storage 160 managed by content management system 106, as described above.

In some implementations, client device 240 can include content management system (CMS) client 250. For example, CMS client 250 can be a native application of client device 240. For example, a native software application can be an application that is built specifically for the hardware and/or software configuration of client device 240. Thus, the graphical user interfaces (and other functionality) of CMS client 250 described below can be implemented using instructions, application programming interfaces (APIs), and other technologies native to client device 240. To generate the various graphical user interfaces below and/or implement various features described herein, CMS client 250 can request data (e.g., content items, notifications, etc.) from content management system 106 (e.g., user interface module 122, collaborative content item management module 136, collections module 204, etc.) over a network connection (e.g., through network 104). Content management system 106 can obtain data from content storage 160, collaborative content item storage 165, collections storage 206, and/or other modules of content management system 106 and send the data to CMS client 250. CMS client 250 can then present the data on various graphical user interfaces generated by CMS client 250, as described further below.

Alternatively, CMS client 250 can be a web client executed by a web browser running on client device 240. Thus, the graphical user interfaces (and other functionality) of CMS client 250 can be implemented using instructions, APIs, and other technologies that are not native to client device 240. For example, CMS client 250 can be built as a web application using non-native web code or instructions (e.g., HTML, JavaScript, etc.). Content management system 106 can serve CMS client 250 to a web browser on client device 240 and the web browser can execute CMS client 250 to present the graphical user interfaces (and other functionality) to the user, as described in detail below. To generate the various graphical user interfaces below and/or implement various features described herein, CMS client 250 (e.g., the web browser) can request various data views (e.g., graphical user interfaces, web pages, etc.) from content management system 106. Content management system 106 can generate the data views (e.g., the graphical user interfaces described below) for presenting content management system data (e.g., content items, notifications, comments, tasks, etc.) and send the data views to CMS client 250 over a network connection (e.g., through network 104). For example, content management system 106 can obtain data from content storage 160, collaborative content item storage 165, collections storage 206, and/or software modules of content management system 106 (e.g., user interface module 122, collaborative content item management module 136, collections module 204, etc.), generate the data views based on the data, and send the data views to CMS client 250.

In some implementations, when a user provides input selecting a collection, CMS client 250 can send the collection identifier corresponding to the selected collection to collections module 204. In response, collections module 204 can use the collection identifier to obtain the collections data from collections data 208, the collection item identifiers from collections items 210, and generate the PSLs for each tile. Collections module 204 can then send the collections data (e.g., collection header information), collection item identifiers (e.g., tile identifiers), and PSLs to CMS client 250 so that CMS client 250 can obtain the relevant content items, metadata, comments, etc., and render the collection graphical user interface, as illustrated below.

To avoid repeating the description of how content items and/or metadata are embedded into a collection, the reader should understand that any content item (e.g., image, text document, multimedia document, slideshow presentation, video, or other media) added to a collection can be embedded into (e.g., linked into) the collection using protected shared links, as described above. Thus, the header background image, the logo, and all tiles within a collection have corresponding PSLs that provide the mechanism by which CMS client 250 can obtain or retrieve the corresponding content items from content storage 160. Collection item metadata (e.g., tile metadata, content item metadata) presented by a collection is embedded into (e.g., linked into) the collection using collection item identifiers, as described above. For example, CMS client 250 can obtain collection item metadata by sending the collection item identifier to collections module 204. Collection module 204 can use the collection identifier to content identifier mapping, as described above, to determine the content item identifier needed to retrieve the relevant content item metadata for a collection item (e.g., tile). Collection module 204 can obtain collection metadata (e.g., caption, comments, etc.) for a tile using the collection item identifier, as described above. Collection module 204 can send the content item metadata and/or the collection item metadata to CMS client 250. CMS client 250 can present the content item metadata and/or the collection item metadata in the appropriate tile when presenting the collection on a display of client device 240.

Figure 3:
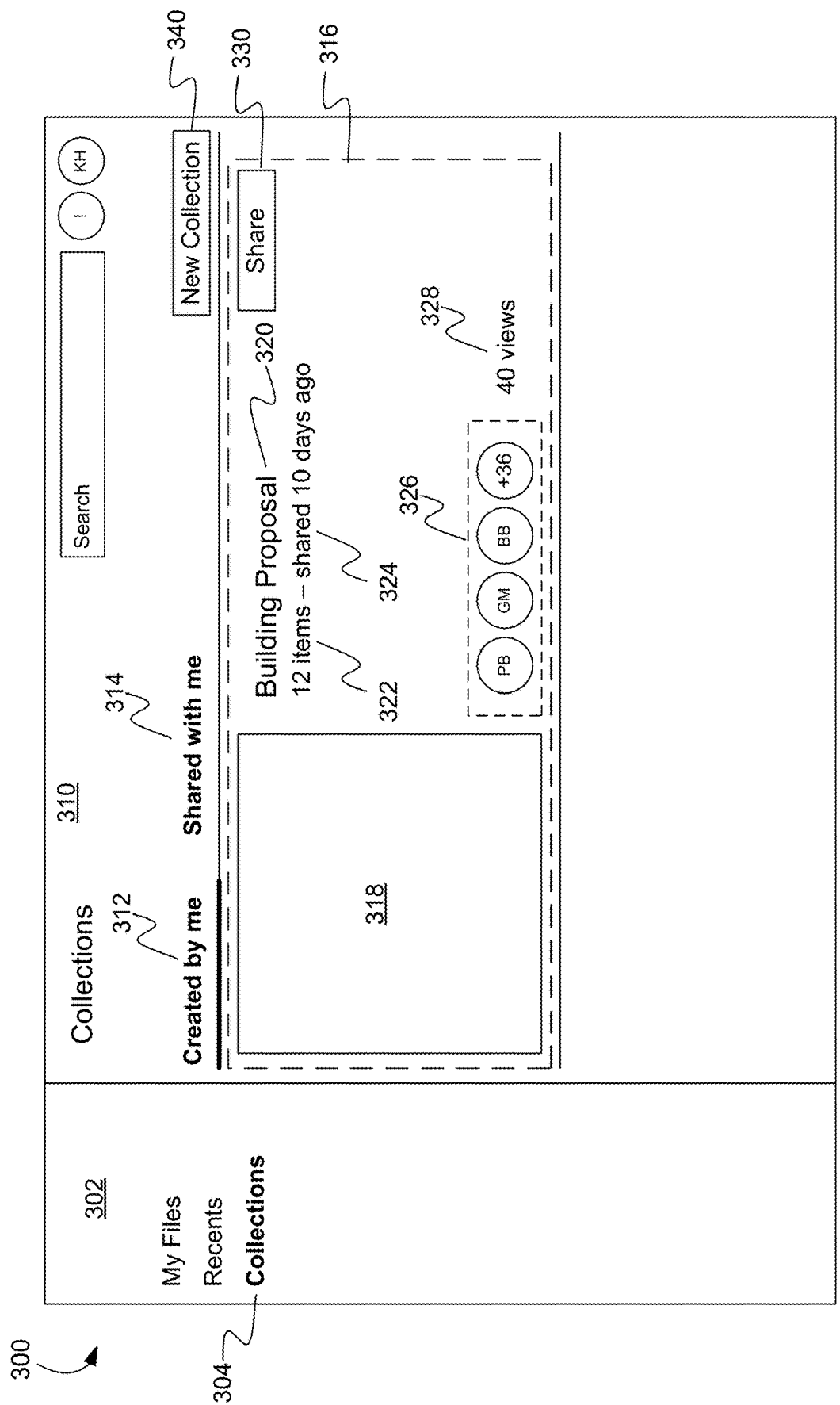
FIG. 3 illustrates an example graphical user interface for viewing collections associated with a user of a content management system.

FIG. 3 illustrates an example graphical user interface 300 for viewing collections associated with a user of content management system 106. For example, GUI 300 can be presented on a display of client device 240 in response to a user of client device 240 selecting graphical element 304 presented on a graphical user interface that provides a view of a user account of content management system 106. For example, a user can log into the user's account with content management system 106 to cause CMS client 250 to present a graphical user interface that presents content items, folders, collections, and/or other data associated with the user's account. The graphical user interface can present a graphical element 304 in area 302 that when selected causes CMS client 250 to present collections associated with the user's account.

In some implementations, GUI 300 can present collections associated with a user account. For example, when CMS client 250 receives a selection of graphical element 312, CMS client 250 can present information describing collections created by the user associated with the user account in area 310. When CMS client 250 receives a selection of graphical element 314, CMS client 250 can present information describing collections shared with the user account in area 310.

In some implementations, GUI 300 can present a collection in collection area 316. Collection area 316 can include information describing a single collection. Multiple collection areas 316 can be presented in area 310 to describe different collections. Collection area 316 can include collection image 318. For example, collection image 318 can be an image selected by a collection creator or editor to represent the corresponding collection. In some implementations, collection image can correspond to the header background image selected for a collection, as described further below. Collection area 316 can include title 320 corresponding to the collection. Collection area 316 can include graphical element 322 indicating the number of items (e.g., content items, collection items, tiles, etc.) in the corresponding collection. Collection area 316 can include graphical element 324 indicating when the collection was shared with the user and/or other users. Collection area 316 can include graphical elements 326 identifying the users of content management system 106 with whom the corresponding collection was shared. Alternatively, graphical elements 326 can identify the users who have viewed the collection. Collection area 326 can include graphical element 328 indicating the number of times the corresponding collection has been viewed by users of content management system 106.

In some implementations, collection area 326 can include graphical element 330 for sharing the corresponding collection. For example, when CMS client 250 receives user input selecting graphical element 330, CMS client 250 can present a graphical user interface for selecting other users with whom the corresponding collection can be shared. The user of client device 240 can then select one or more users and CMS client 250 can cause collections module 204 to share the collection with the selected users. Collections module 204 can, for example, send a link to the collection to the other users and/or add the collection to the other users' accounts managed by content management system 106.

In some implementations, GUI 300 can include graphical element 340 for creating a new collection. For example, in response to receiving user input selecting graphical element 340, CMS client 250 can cause collections module 204 to generate a new collection. Collections module 204 can then send the new collection (e.g., an empty collection at this point) to CMS client 250. CMS client 250 can then present the empty collection, as illustrated by FIG. 4.

Figure 4:
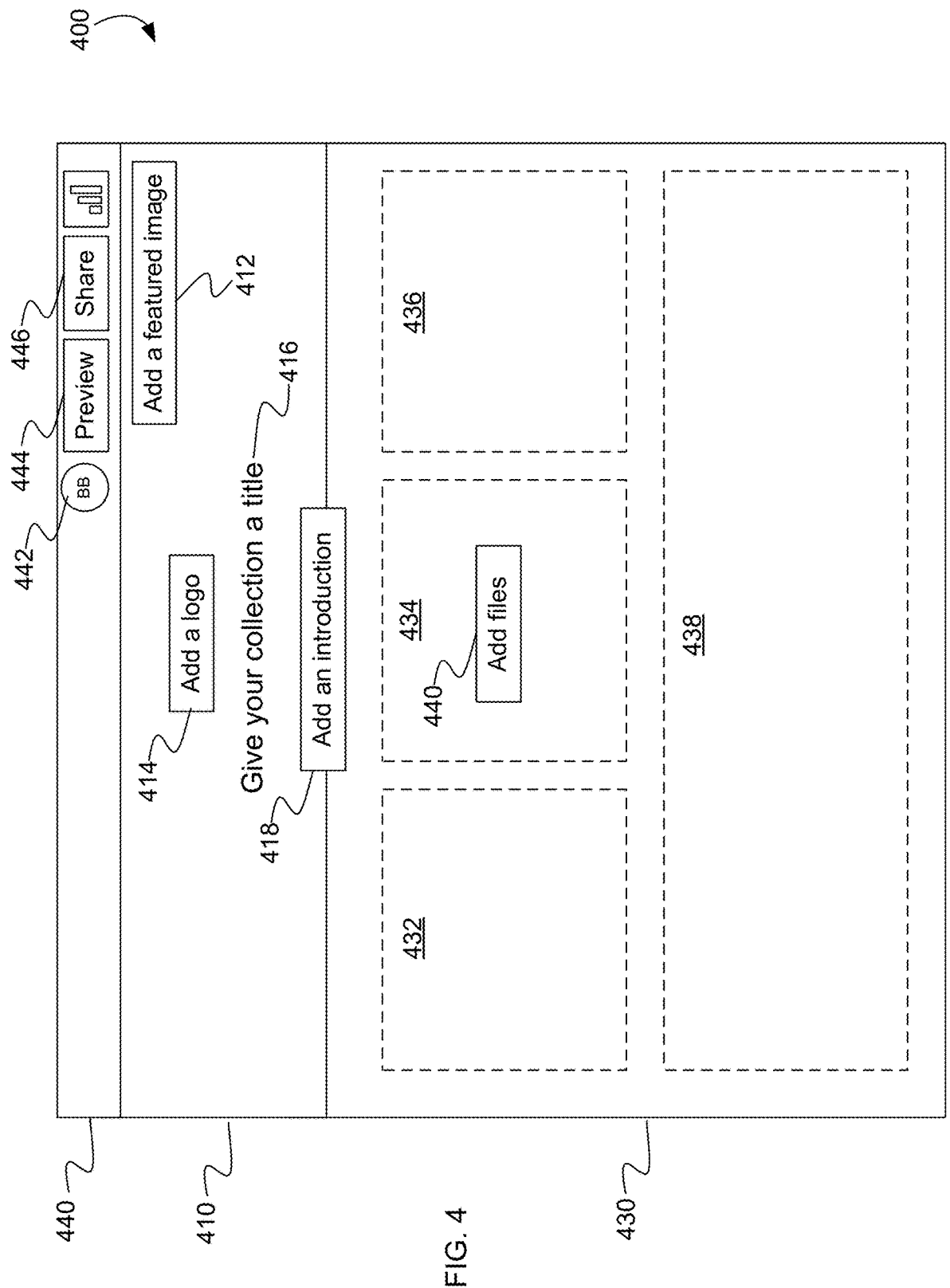
FIG. 4 illustrates an example graphical user interface for adding content to a new collection.

FIG. 4 illustrates an example graphical user interface 400 for adding content to a new collection. For example, GUI 400 can be presented by CMS client 250 on a display of client device 240 in response to receiving user input selecting graphical element 340 of FIG. 3. CMS client 250 can receive an empty collection from collections module 204 and present the empty collection on GUI 400.

In some implementations, GUI 400 can include collection header area 410. For example, area 410 can include graphical element 412 for adding a header background image to the collection. For example, in response to receiving user input selecting graphical element 412, CMS client 250 can present a graphical user interface (e.g., similar to GUI 500 below) for selecting an image to represent the new collection. After the user has selected an image (e.g., a content item from content storage 160, an image from another source, etc.), client device 240 can send the image and/or content item identifier to collections module 204. Collections module 204 can then generate a protected shared link (PSL) for the header background image, as described above, and store the PSL in the header information for the collection. CMS client 250 can then use the PSL to obtain the corresponding image and present the image in header area 410.

In some implementations, header area 410 can include graphical element 414 for adding a logo to the collection header information. For example, in response to receiving user input selecting graphical element 414, CMS client 250 can present a graphical user interface (e.g., similar to GUI 500 below) for selecting an image (e.g., a logo) to present on the new collection. The image can represent a group, company, product, or some other entity, for example. After the user has selected an image (e.g., a content item from content storage 160, an image from another source, etc.), client device 240 can send the image and/or content item identifier to collections module 204. Collections module 204 can then generated a protected shared link (PSL) for the logo image, as described above, and store the PSL in the header information for the collection. CMS client 250 can then use the PSL to obtain the corresponding logo image and present the logo image in header area 410.

In some implementations, header area 410 can include graphical element 416 for specifying a title for the new collection. For example, a user can select graphical element 416 and enter text to specify a title for the new collection.

After entering the text, CMS client 250 can send the text to collections module 204. Collections module 204 can store the text as the title in the header information for the collection, as described above.

In some implementations, header area 410 can include graphical element 418 for adding an introductory description to the new collection. For example, a user can select graphical element 418 and enter text to specify an introductory description for the new collection. After entering the text, CMS client 250 can send the text to collections module 204. Collections module 204 can store the text as the introduction for the collection in the header information for the collection, as described above.

In some implementations, GUI 400 can include tile area 430. For example, tile area 430 can include tiles corresponding to the content items embedded in the collection. When GUI 400 presents an empty collection, tile area 430 can present empty tiles (e.g., boxes with dashed lines) representing a possible layout of tiles should content items be added to the collection later. For example, a tile can have a narrow format, such as tiles 432, 434, and 436. The narrow format of these tiles can allow for multiple tiles to be arranged in a single horizontal row. A tile can have a wide format, such as tile 438, that causes the tile to be presented across the full width (or nearly the full width) of tile area 430. Thus, when a tile has a wide format, only one tile will be presented in a single horizontal row, as illustrated by tile 438.

In some implementations, the position of tiles within tile area 430 can be predefined. For example, the size of narrow format and wide format tiles can be predefined so that the tiles can be arranged within tile area 430 according to predefined positions and/or arrangements. Thus, a collection can be created according to a template that constrains the layout of tiles within tile area 430 and restricts the type of content allowed in the collection (other than the header information) to content items and metadata that are embedded in the tiles.

In some implementations, tile area 430 can include graphical element 440 for adding content items to tile area 430. For example, in response to receiving user input selecting graphical element 440, CMS client 250 can present a graphical user interface (e.g., similar to GUI 500 below) for selecting one or more content items to embed in the collection. After the user has selected a content item (e.g., a content item from content storage 160, a content item from another source, etc.), client device 240 can send the content item and/or content item identifier to collections module 204. Collections module 204 can then generate a collection item identifier and a protected shared link (PSL) for the content item, as described above. Collections module 204 can store the collection item identifier and the PSL in collection items 210 and send the PSL and collection item identifier to CMS client 250. CMS client 250 can then use the PSL to obtain the corresponding content item. CMS client 250 can use the collection item identifier to obtain the corresponding collection item metadata. CMS client 250 can then present the content item and/or the collection item metadata in a tile in tile area 430.

In some implementations, CMS client 250 can add a content item to the new collection in response to a drag and drop input received from a user of client device 240. For example, the user can select and drag a content item from a storage location on client device 240 and drop the content item in tile area 430 or on a tile representation (e.g., a dashed tile placeholder) in tile area 430. In response to receiving the drag and drop input related to the content item, client device 240 can send the content item and/or content item identifier to collections module 204. Collections module 204 can then generate a collection item identifier and a protected shared link (PSL) for the content item, as described above. Collections module 204 can store the collection item identifier and the PSL in collection items 210 and send the PSL and collection item identifier to CMS client 250. CMS client 250 can then use the PSL to obtain the corresponding content item. CMS client 250 can use the collection item identifier to obtain the corresponding collection item metadata. CMS client 250 can then present the content item and/or the collection item metadata in a tile in tile area 430.

In some implementations, GUI 400 can include options area 440. For example, options area 440 can present graphical element 442 identifying the user who is currently logged into content management system 106 on client device 240.

In some implementations, options area 440 can present graphical element 442 for generating a preview of the collection. For example, a collection can have a public view and a private view. The private view is presented to the creator and/or editor of the collection. The public view is presented to users with whom the collection has been shared but who do not have editing privileges with respect to the collection. The private view of the collection may present additional information and/or graphical elements that are not presented in the public view because the public view is intended to have a more curated look without all the extra information and tools needed to edit and manage a collection. For example, the public view may not include any of the editing features that allow a user to add or rearrange content in the collection. The public view may not include statistical information, such as the number of times the collection has been viewed. The public view will not include the tile placeholders (e.g., dashed lined boxes) representing tiles that have no embedded content. When an editing or creating user selects graphical element 442 to present a preview of the collection, CMS client 250 can generate and present a public view of the collection so that the editor can view how the collection will look when the collection is shared with (e.g., published to) users who do not have editing permissions for the collection.

In some implementations, options area 440 can include graphical element 446 for sharing the collection with other users. For example, when CMS client 250 receives user input selecting graphical element 446, CMS client 250 can present a graphical user interface for selecting other users with whom the corresponding collection can be shared. The user of client device 240 can then select one or more users from the graphical user interface and CMS client 250 can cause collections module 204 to share the collection with the selected users. Collections module 204 can, for example, send a link to the collection to the other users and/or add the collection to the other users' accounts managed by content management system 106.

Figure 5:
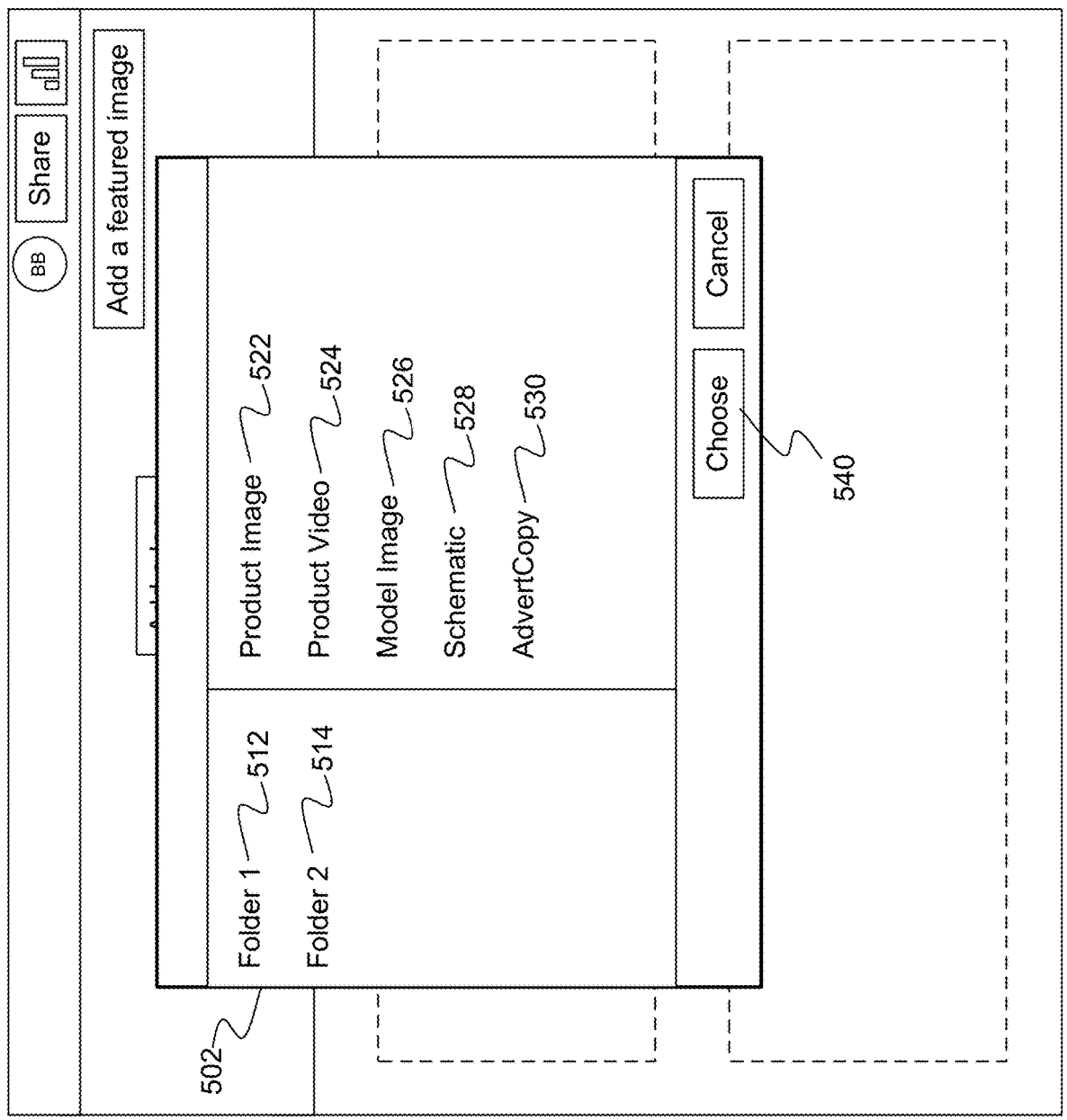
FIG. 5 illustrates an example graphical user interface for choosing content items to add to a collection.

FIG. 5 illustrates an example graphical user interface 500 for choosing content items to add to a collection. For example, GUI 500 can be presented by CMS client 250 on a display of client device 240.

In some implementations, GUI 500 can include graphical element 502 for choosing content items to add to a collection. For example, graphical element 502 can be presented in response to receiving user input selecting graphical element 412, 414, and/or 440 of FIG. 4. Graphical element 502 can present folders (e.g., folders 512, 514) and/or content items (e.g., content items 522-530) accessible to the user account associated with the user who is currently logged in to content management system 106 from client device 240.

The user can select a content item folder managed by content management system 106 to cause graphical element 502 to present identifiers for content items associated with the selected folder. The user can select one or more of the content item identifiers and then select graphical element 540 to cause CMS client 250 and/or collections module 204 to add the identified content items to the currently selected collection (e.g., a new collection, selected collection, etc.), as described above.

Figure 6:
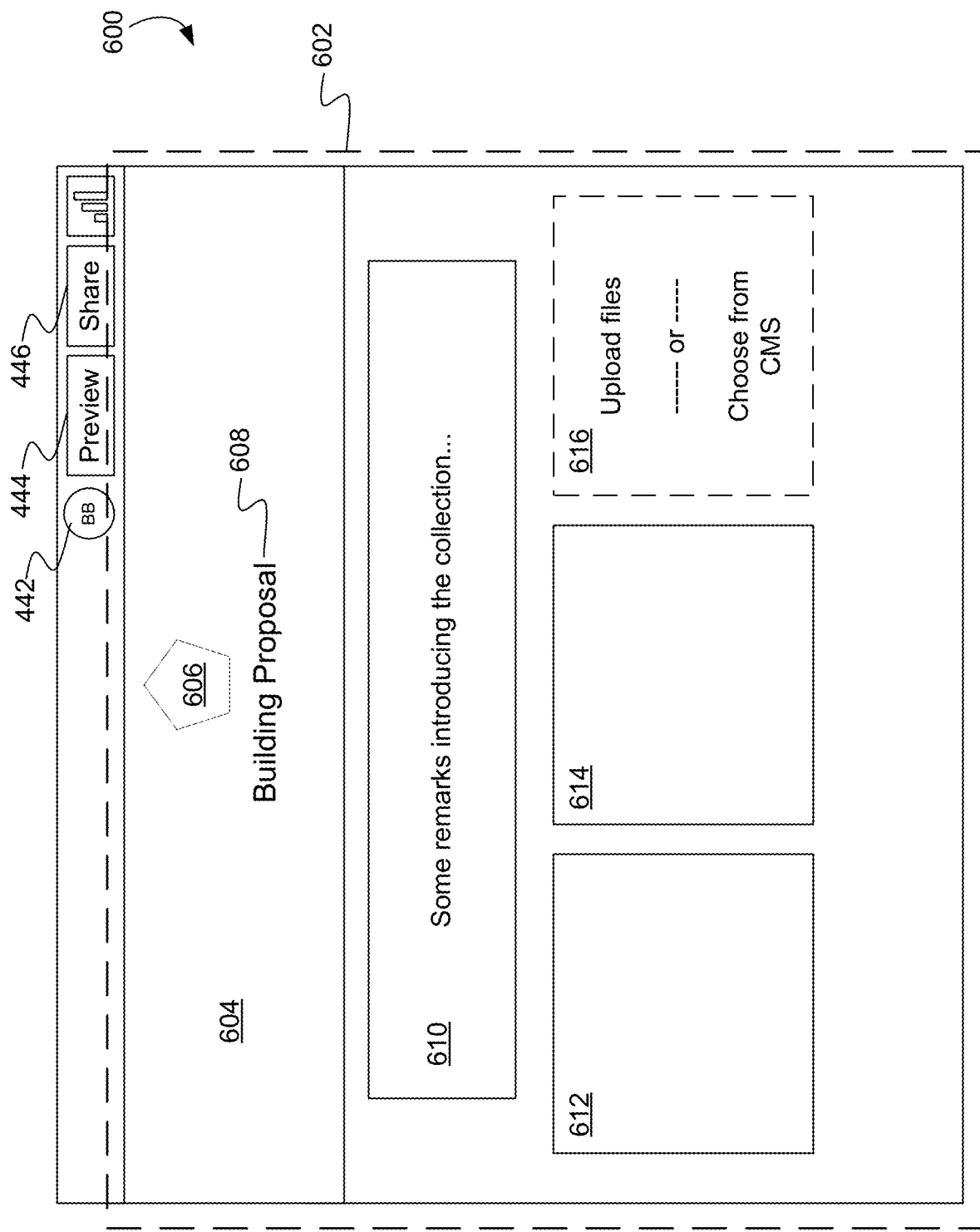
FIG. 6 illustrates an example graphical user interface presenting a collection having embedded content items.

FIG. 6 illustrates an example graphical user interface 600 presenting a collection having embedded content items. For example, GUI 600 can be presented in response to the user adding content to a new collection using GUI 500. GUI 600 can be presented in response to the user selecting an existing collection, such as providing input to GUI 300 to select the collection presented in collection area 316. For example, the user can select the "Building Proposal" collection by providing input selecting image 318 and/or title 320.

In some implementations, GUI 600 can present collection 602. For example, when CMS client 250 receives input selecting a collection, CMS client 250 send a request including the collection identifier to collections module 204. Collections module 204 can use the collection identifier to obtain collection header data from collections data 208. Collections module 204 can use the collection identifier to obtain collection item identifiers from collection items 210 for the content item metadata (e.g., tiles) embedded in the identified collection. Collections module 204 can generate a PSL for each embedded content item in the identified collection. Collections module 204 can send the collection header information, collection item identifiers, and PSLs to CMS client 250 so that CMS client 250 can present collection 602 on GUI 600.

As described above, collection 602 can include a header background image 604 (e.g., collection image) representing collection 602. Collection 602 can include an image 606 (e.g., a logo image) representing a business, product, team, or some other group or individual associated with the collection. CMS client 250 can obtain image 604 and/or image 606 using PSLs provided by collections manager 204. Collection 602 can include title 608 and introduction 610. The text for title 608 and introduction 610 can be obtained from the collection header data received from collections module 204.

In some implementations, collection 602 can include tiles 612 and 614 that include embedded content items. The embedded content items in tiles 612 and 614 can be represented by a tile image (e.g., thumbnail image) that represents a portion of the embedded content item. The tile image can be rendered by content item module 226 when CMS client 250 requests the tile image from content item module 226 using the PSL for the corresponding tile. CMS client 250 can use the collection item identifier associated with a tile to request metadata for the tile. For example, the metadata for the tile can be a combination of content item metadata (e.g., content item name, content item type, etc.) obtained from content item module 226 and collection item metadata (e.g., comments) obtained from collections module 204, as described above.

When a user is viewing a private, editable view of collection 602, collection 602 can include an empty tile 616 (e.g., represented by dashed line) that the user can interact with to embed additional content into collection 602. For example, the user can select tile 616 to cause CMS client 250 to present graphical element 502 of FIG. 5 so that the user can select content items to add to collection 602. Alternatively, the user can drag and drop a content item onto tile 616 to cause CMS client 250 to add the content item into collection 602. When interacting with a private view of collection 602, the user may select and drag tiles around to change the position or arrangement of embedded content items in collection 602. When viewing a public, non-editable view of collection 602, empty tile 626 can be hidden and the user may not be able to edit collection 602.

Figure 7:
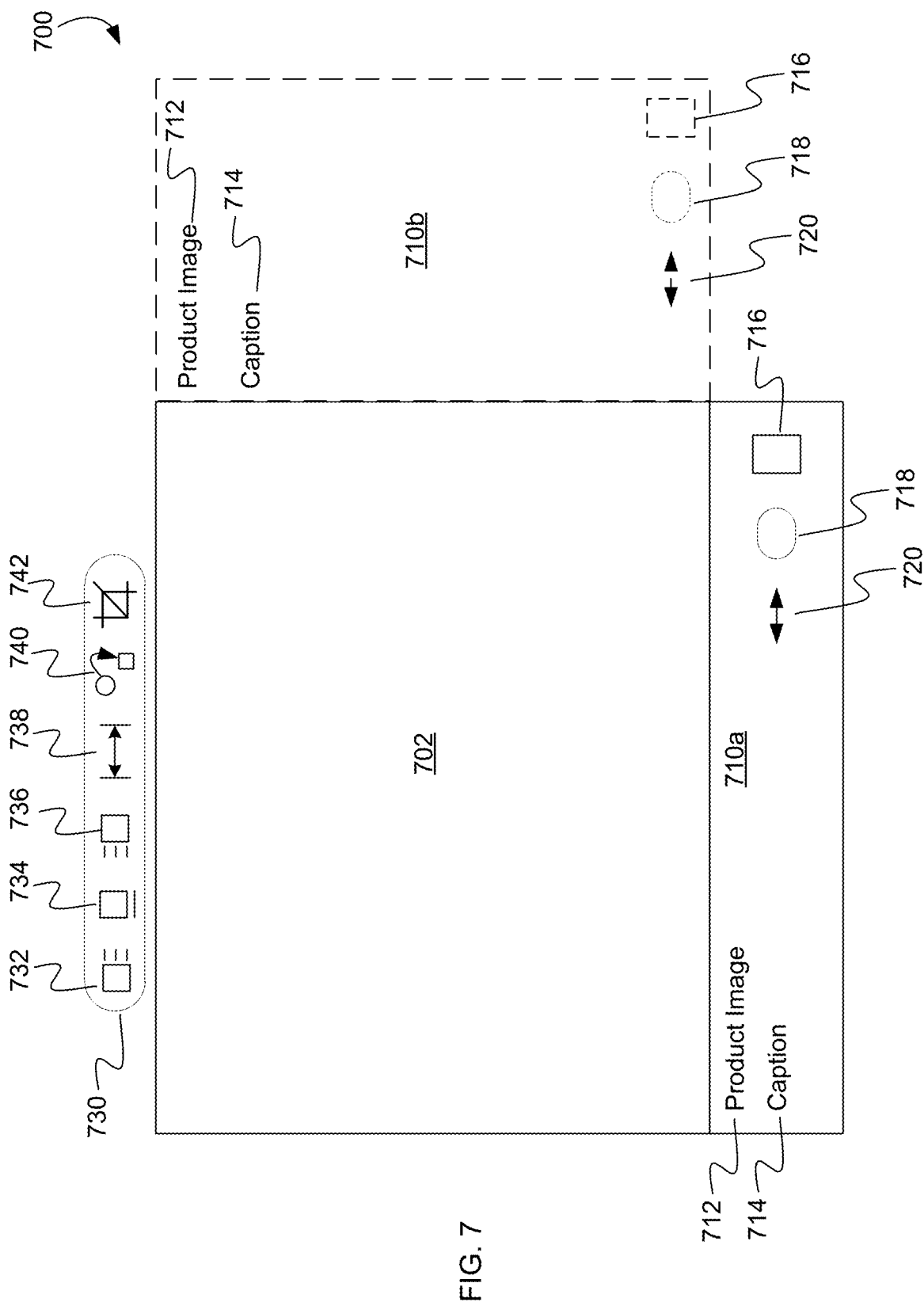
FIG. 7 illustrates an example tile graphical user interface.

FIG. 7 illustrates an example tile graphical user interface 700. The features described with respect to GUI 700 can be features of any or every tile presented in a collection. For example, GUI 700 may correspond to tiles 612 and/or 614 of GUI 600, described above. However, when viewing a tile in a public view of a collection (e.g., collection 602), the user may not be able to access any of the tile editing features described with respect to GUI 700. For example, the user may not be able to adjust the layout of a tile, replace an embedded content item associated with a tile, or crop the image in a tile. When viewing the tile in a private, editable view of a collection, any or all of the described editing options can be made available.

In some implementations, GUI 700 can include an image area 702. For example, image area 602 can present an image (e.g., tile image, thumbnail image, etc.) representing the content item embedded into the tile. The image can be obtained from content item module 226 by CMS client 250 using the PSL provided by collection module 204.

In some implementations, GUI 700 can include area 710 for presenting metadata and/or options for the tile. For example, area 710 can include graphical element 712 (e.g., text) representing the name of the content item presented in area 702. Area 710 can include graphical element 714 (e.g., text) representing a caption for the content item presented in area 702 or representing type information for the content item if a caption has not been provided. This content item metadata (content item name, content item type, collection item caption, etc.) can be obtained using the collection item identifier provided by collections module 204, as described above.

In some implementations, area 710 can include graphical element 716 for deleting the tile. For example, when the collection is presented in a private, editable view, the user can select graphical element 716 to delete the tile and corresponding embedded content item from the collection. When the collection is presented in a public view, graphical element 716 can be hidden.

Figure 10:
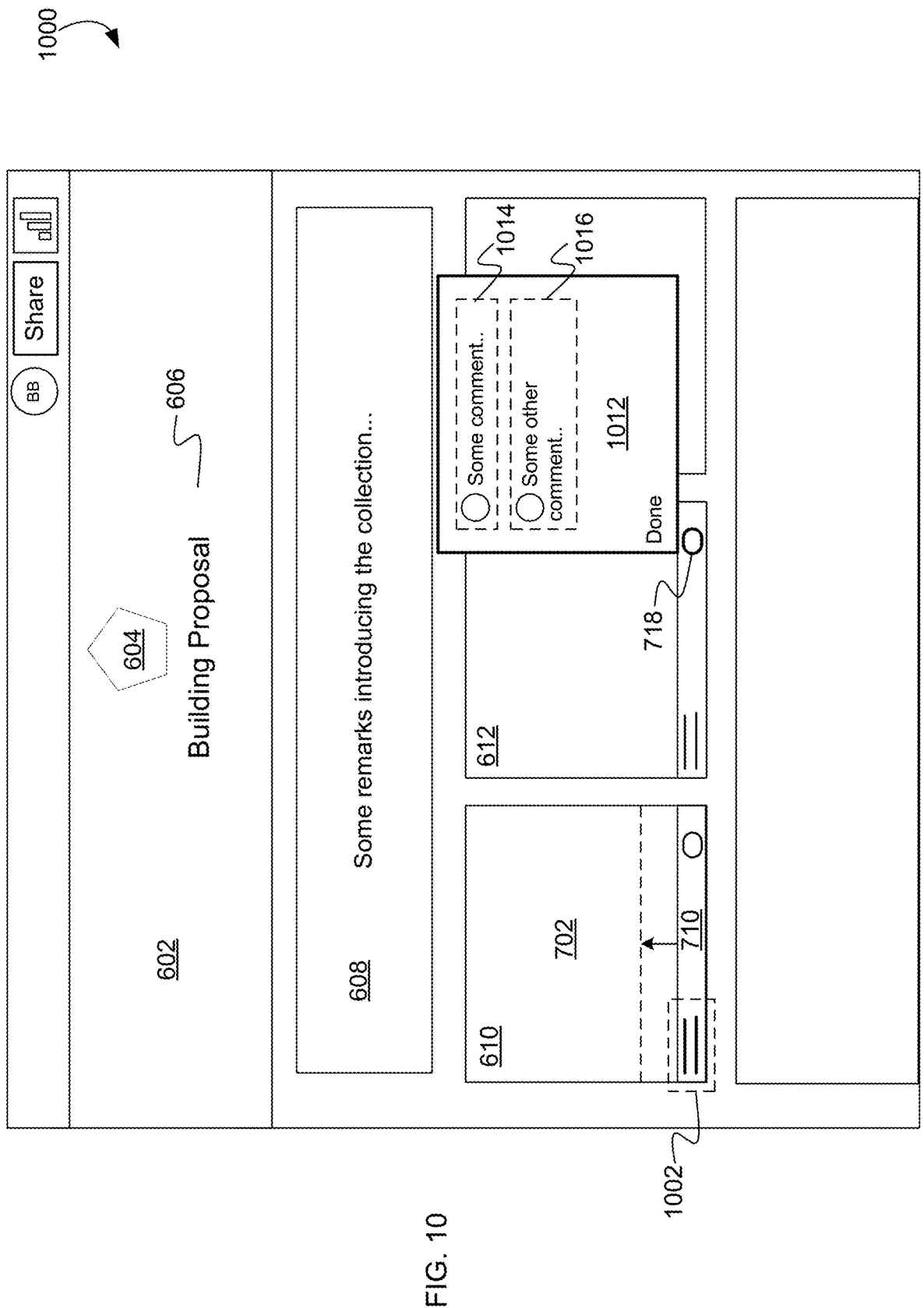
FIG. 10 illustrates an example graphical user interface for presenting collection item metadata in a collection view.

In some implementations, area 710 can include graphical element 718 for presenting collection comments associated with the tile. For example, a user can select graphical element 718 to cause CMS client 250 to present a graphical element (e.g., popup window) that presents collection comments associated with the tile and/or corresponding embedded content item, as illustrated by FIG. 10 below. Graphical element 718 can be presented in both public and private views of the collection because any user may add comments to a collection and/or collection item (e.g., tile).

In some implementations, area 710 can include graphical element 720 for invoking a full preview of the embedded content item, as described with respect to FIG. 8 and FIG. 9 below. For example, when graphical element 720 is selected, CMS client 250 can use a PSL corresponding to the content item embedded in image area 702 to request a full preview of the content item represented in image area 702. In contrast to the tile image presented in image area 702 that presents a portion of the content item (e.g., less than the entire content item), the full preview image of the content item can be a manipulable representation of the embedded content item that allows the user to view and/or navigate through the entire content item.

In some implementations, GUI 700 can include graphical element 730 (e.g., a toolbar) for presenting formatting options for a tile. For example, when a collection is presented in a private, editable view, the user can select a tile (e.g., touch, hover a cursor over, etc.) to cause graphical element 730 to be presented near the selected tile. The user can then select one or more of the tile formatting options presented on graphical element 730 to make the corresponding changes to the selected tile.

In some implementations, graphical element 730 can include metadata orientation graphical elements 732, 734, and 736. For example, the user can select graphical element 732, 734 and 736 to change where area 710 is presented in the tile and with respect to image area 702. For example, when graphical element 734 is selected, CMS client 250 can present area 710 in a horizontal orientation below image area 702, as illustrated by image area 702*a*. When graphical element 732 is selected, CMS client 250 can present area 710 in a vertical orientation to the right of image area 702, as illustrated by image area 702*b*. When graphical element 736 is selected, CMS client 250 can present area 710 in a vertical orientation similarly to image area 702*b* but to the left of image area 702.

In some implementations, graphical element 730 can include graphical element 738 for switching between narrow views and wide views of a tile. For example, if the tile is currently presented as a narrow tile, the user can select graphical element 730 to cause CMS client 250 to present the tile in a wide view, as described above. If the tile is currently presented as a wide tile, the user can select graphical element 730 to cause CMS client 250 to present the tile in a narrow view, as described above.

In some implementations, graphical element 730 can include graphical element 740 for replacing a content item in the selected tile. For example, when a user selects graphical element 740, CMS client 250 can present GUI 500 of FIG. 5 so that the user can choose a new content item to replace the content item currently embedded in the selected tile. When the user selects a new content item, CMS client 250 can communicate with collaborations module 204 to modify the collection item entry for the tile in collection items 210 so that the collection item entry references the newly selected content item.

In some implementations, graphical element 730 can include graphical element 742 for selecting a portion of the content item to present in the selected tile. For example, in response to receiving a selection of graphical element 742, CMS client 250 can present an image cropping GUI that allows the user to specify a portion of the corresponding content item to present in image area 702. After the user specifies the portion of the content item to present in image area 702, CMS client 250 can send information identifying the location of the selected portion of the image to collections module 104. Collections module 104 can then store the image location information in collection items 210 so that the selected portion of the image can be presented when the content item is presented in the future.

Figure 8:
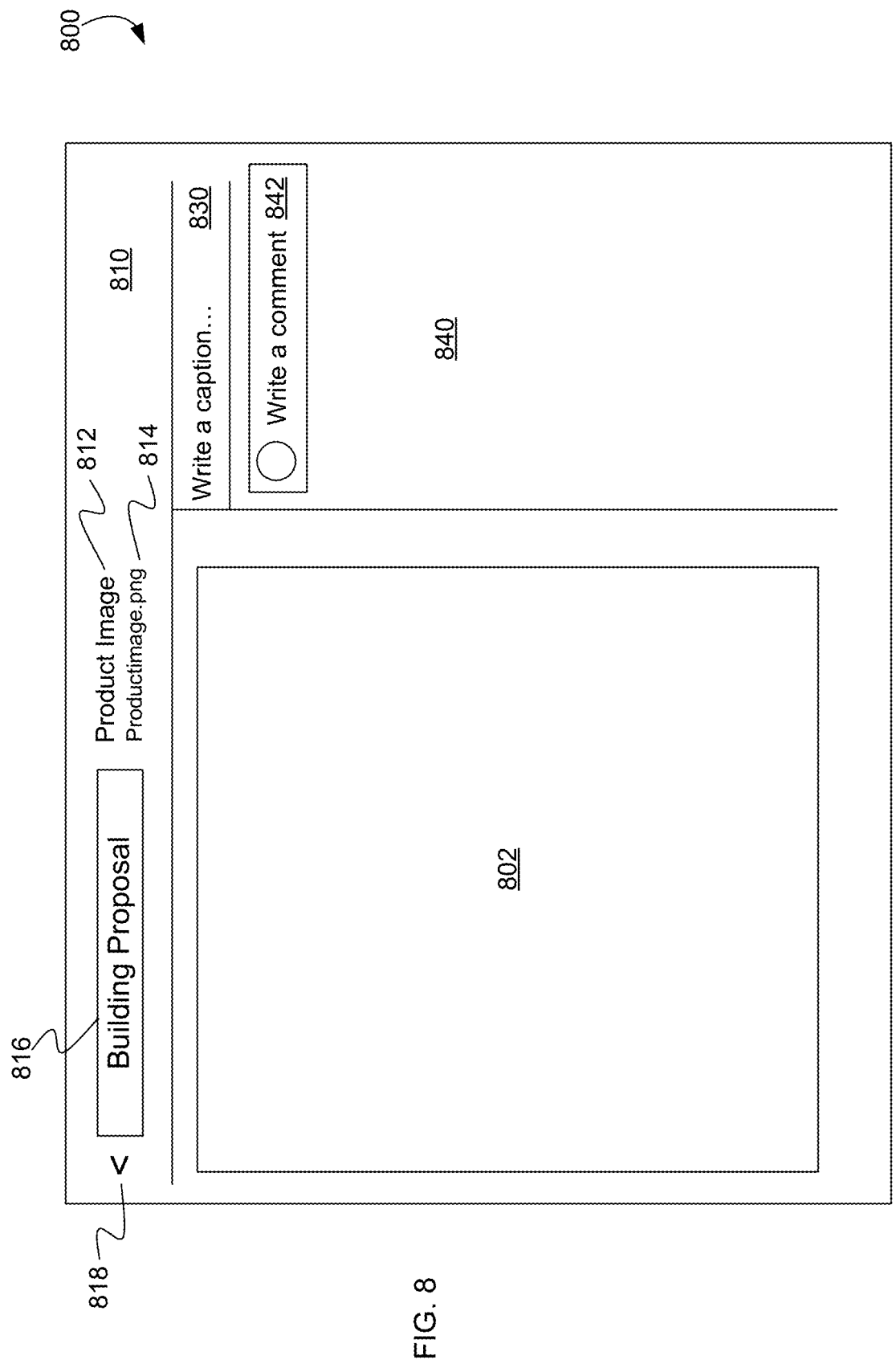
FIG. 8 illustrates an example graphical user interface for presenting a full preview of a content item without caption or comments.

FIG. 8 illustrates an example graphical user interface 800 for presenting a full preview of a content item without caption or comments. For example, GUI 800 can be presented by CMS client 250 on a display of client device 240 in response to a user selecting graphical element 720 of FIG. 7. In some implementations, GUI 800 can include image area 802. For example, image area 802 can present a full preview of a content item associated with a selected tile. CMS client 250 can obtain the full preview of the content item from content item module 226 using a PSL associated with the content item provided by collections module 204. Image area 802 can provide an interactive view of the content item such that a user can interact with image area 802 to scroll, zoom, and/or otherwise interact with the content item so that the user can view and/or navigate through the entire content item.

In some implementations, GUI 800 can include header area 810. For example, area 810 can include the display name 812 and content item name or type 814 of the content item presented in image area 802. Area 810 can include the identifier 816 (e.g., name) for the currently selected collection. Area 810 can include graphical element 818, that when selected, causes CMS client 250 to close GUI 800 and return to the collection GUI 600.

In some implementations, GUI 800 can include caption area 830. For example, a user can provide textual input in area 830 to provide a caption descriptive of the content item presented in area 802. CMS client 250 can send the entered caption to collections module 204. Collections module 204 can store the caption in association with the collection item identifier for the selected tile in collection items 210, as described above.

In some implementations, GUI 800 can include comments area 840. For example, comments area 840 can include element 842 for entering a new comment for the corresponding content item and/or collection tile. When the user enters a new comment, CMS client 250 can send the entered comment to collections module 204. Collections module 204 can generate a comment identifier for the comment and store the comment identifier in association with the collection item identifier for the selected tile in collection items 210, as described above. Collections module 204 can store the text of the comment in association with the comment identifier in comments 212 in collections storage 206.

Figure 9:
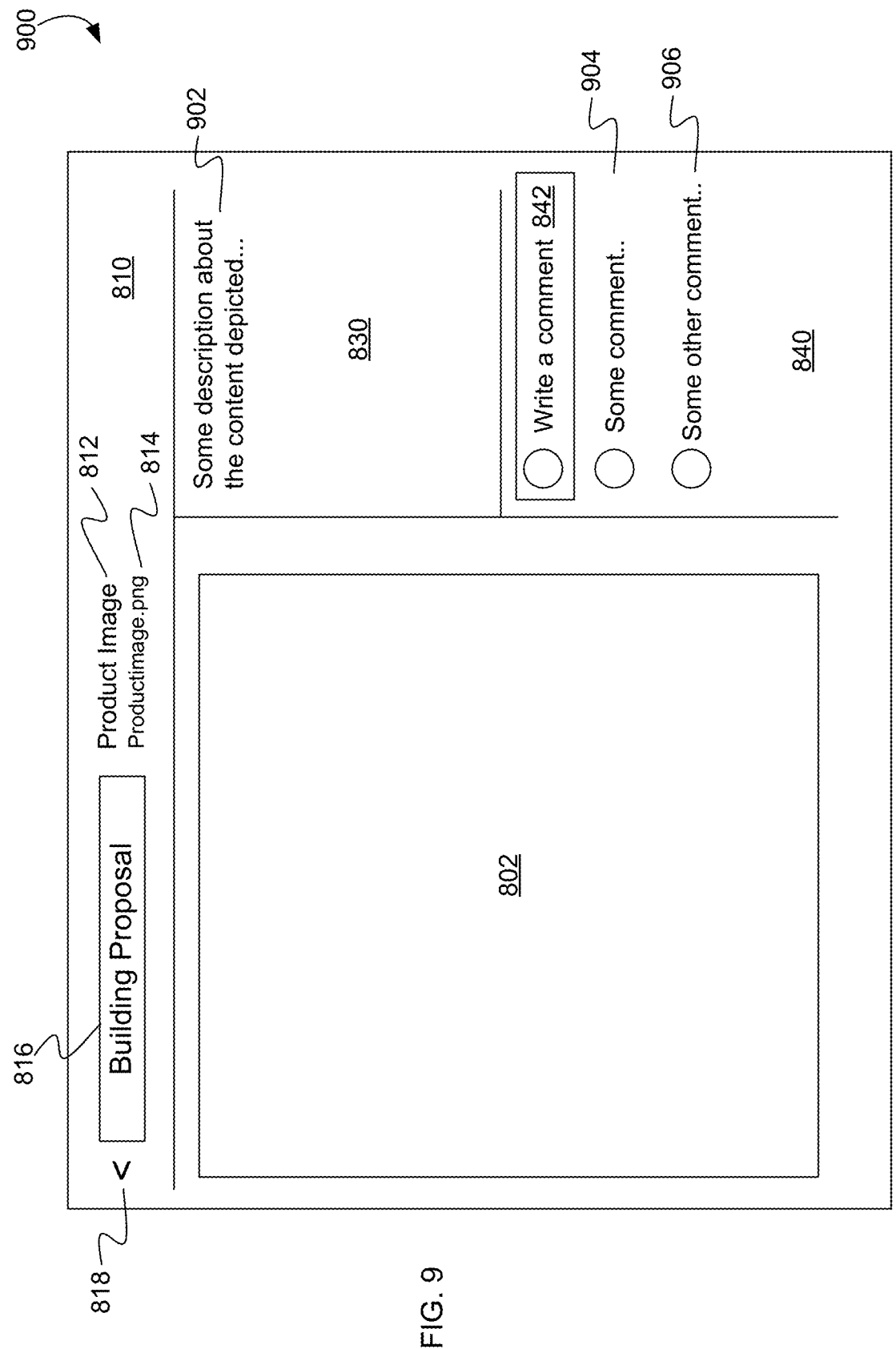
FIG. 9 illustrates an example graphical user interface for presenting a full preview of a content item having a caption and/or comments.

FIG. 9 illustrates an example graphical user interface 900 for presenting a full preview of a content item having a caption and/or comments. For example, GUI 900 can be presented by CMS client 250 on a display of client device 240 in response to a user selecting graphical element 720 of FIG. 7. Similarly to GUI 800, GUI 900 can include image area 802. For example, image area 802 can present a full preview of a content item associated with a selected tile. CMS client 250 can obtain the full preview of the content item from content item module 226 using a PSL associated with the content item provided by collections module 204. Image area 802 can provide an interactive view of the content item such that a user can interact with image area 802 to scroll, zoom, and/or otherwise interact with the content item so that the user can view and/or navigate through the entire content item.

Similarly to GUI 800, GUI 900 can include header area 810. For example, area 810 can include the display name 812 and content item name or type 814 of the content item presented in image area 802. Area 810 can include the identifier 816 (e.g., name) for the currently selected collection. Area 810 can include graphical element 818, that when selected, causes CMS client 250 to close GUI 900 and return to the collection GUI 600.

Similarly to GUI 800, GUI 900 can include caption area 830. For example, when CMS client 250 requests the full preview image for the content item corresponding to the selected tile, CMS client 250 can request collection metadata for the selected tile by sending the collection item identifier for the selected tile to collections module 204. Collections module 204 can use the collection item identifier to obtain a caption associated with the collection item identifier from collection items 210, if a caption exists. Collections module 204 can send the caption to CMS client 250 and CMS client 250 can present the caption in caption area 830.

Similarly to GUI 800, GUI 900 can include comments area 840. For example, when CMS client 250 requests the full preview image for the content item corresponding to the selected tile, CMS client 250 can request collection metadata for the selected tile by sending the collection item identifier for the selected tile to collections module 204. Collections module 204 can use the collection item identifier to obtain a comment identifiers and/or comment thread identifiers associated with the collection item identifier from collection items 210, if a comments exists. Collections module 204 can obtain the comments corresponding to the comment identifiers and/or comment thread identifiers from comments 212. Collections module 204 can send the identified comments (e.g., comments 904 and 906) to CMS client 250. CMS client 250 can present the comments in comments area 840.

FIG. 10 illustrates an example graphical user interface 1000 for presenting collection item metadata in a collection view. For example, GUI 1000 can be presented by CMS client 250 on a display of client device 240. GUI 1000 can present a view (e.g., public view or private view) of a collection similarly to GUI 600 of FIG. 6 described above.

As described with reference to FIG. 7, a tile can include image area 702 and metadata area 710. Metadata area 710 can include text representing a caption associated with the content item presented in image area 702. However, in some cases, the caption may be too long (e.g., too many characters) to fit within metadata area 710 and must be truncated to fit within the available space. In some implementations, a user can cause CMS client 250 to expand metadata area 710 by providing input to (e.g., selecting, touching, hovering over, etc.) area 1002 corresponding to where the caption is presented in metadata area 710. In response to receiving the user input to area 1002, CMS client 250 can expand metadata area 710 into image area 702 (e.g., up to dashed line) so that the entire caption can be presented within tile 610. When the user stops providing input to area 1002, CMS client 250 can reduce metadata area 710 to its original size.

As described above with reference to FIG. 7, a tile can include graphical element 718 for presenting comments associated with a tile (e.g., collection item) and/or corresponding content item. For example, a user can select graphical element 718 to cause CMS client 250 to request comments for the tile from collections module 204. For example, CMS client 250 can send the collection item identifier for the selected tile to collections module 204. Collections module 204 can use the collection item identifier to obtain a comment identifiers and/or comment thread identifiers associated with the collection item identifier from collection items 210, if a comments exists. Collections module 204 can obtain the comments corresponding to the comment identifiers and/or comment thread identifiers from comments 212. Collections module 204 can send the identified comments (e.g., comments 1014 and 1016) to CMS client 250. When CMS client 250 receives the comments from collections module 204, CMS client 250 can present graphical element 1012 (e.g., a window, popup, bubble, etc.) that presents the comments received from collections module 204.

Figure 11A:
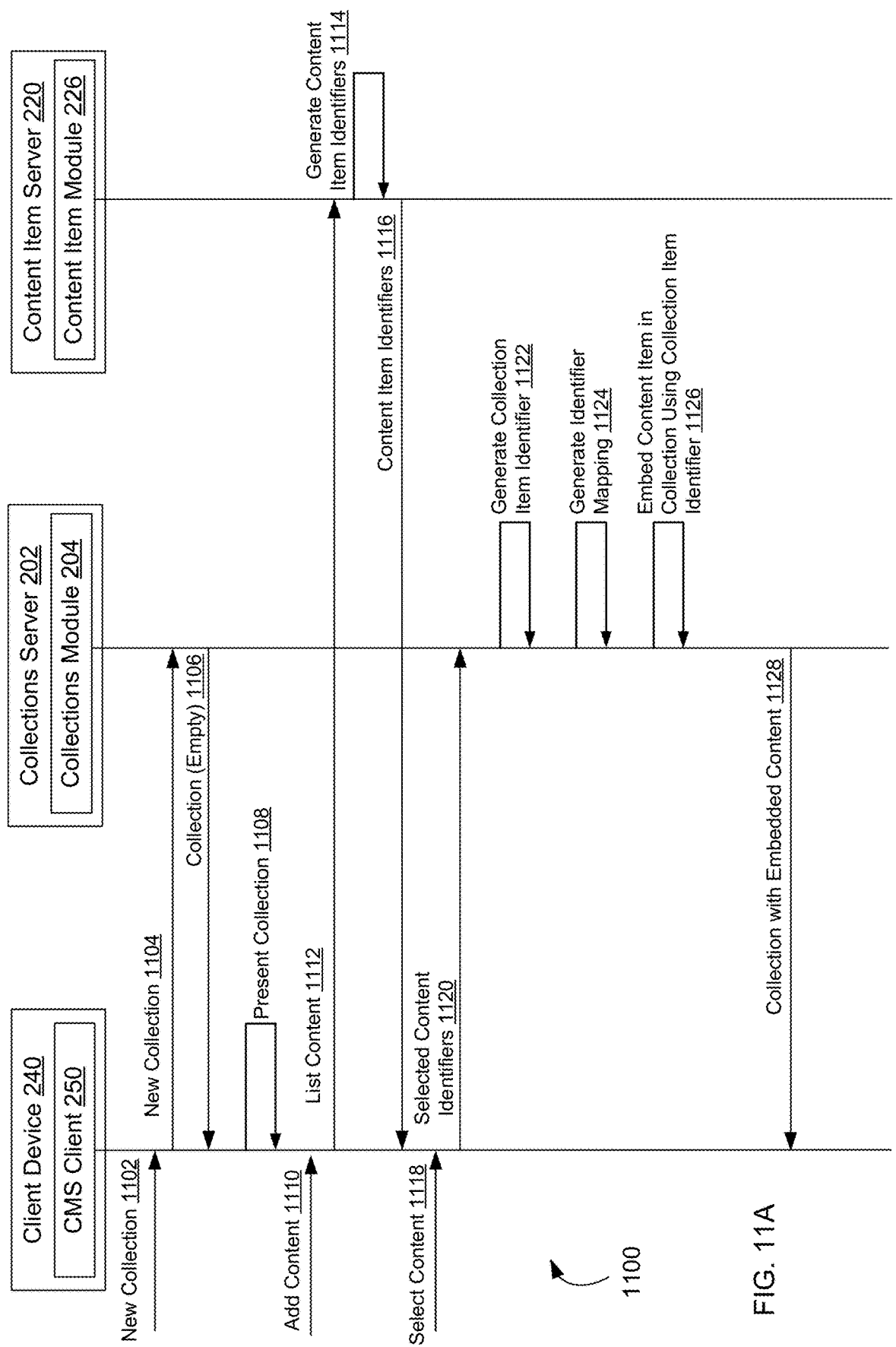
FIG. 11A shows a flow diagram of an example process for creating a collection.

FIG. 11A shows a flow diagram of an example process 1100 for creating a collection. For example, process 1100 can be performed cooperatively by collections server 202, content item server 220, and client device 240 to create a new collection.

At step 1102, client device 240 can receive user input indicating that the user wishes to create a new collection. For example, CMS client 250 can receive a selection of graphical element 340 of FIG. 3.

At step 1104, client device 240 can send a request for a new collection to collections server 202. For example, in response to receiving the user input at step 1102, CMS client 250 can send a request for a new collection to collections module 204.

At step 1106, collections server 202 can send an empty collection to client device 250. For example, collections module 204 can generate an empty collection and send the empty collection to CMS client 250.

At step 1108, client device 240 can present the empty collection. For example, CMS client 250 can present the empty collection on a display of client device 240, as illustrated by FIG. 4. The empty collection can include graphical elements illustrating possible layout of tiles in the collection. The empty collection can include graphical elements that the user can select to add content to the empty collection.

At step 1110, client device 240 can receive user input to add content to the empty collection. For example, the user can select one or more graphical elements presented with the empty collection to add a header background image, a logo image, and/or one or more embedded content items to the empty collection.

At step 1112, client device 240 can send a request to content item server 220 for content item identifiers representing content items managed by content item module 226. CMS client 250 can request a list of content item identifiers from content item module 226 representing the content items for which the user has access permissions.

At step 1114, content item server 220 can generate a list of content item identifiers. For example, content item module 226 can generate a list of content items that the user for which the user has access permissions.

At step 1116, content item server 220 can send the content item identifiers to client device 240. For example, upon receipt of the content item identifiers, CMS client 250 can present a graphical user interface (e.g., GUI 500) for choosing content items from content storage 160, client device 240, or some other storage location.

At step 1118, client device 240 can receive user input selecting one or more content item identifiers from the chooser graphical user interface. For example, CMS client 250 can receive user input selecting content items for the header background image, a logo image, and/or one or more embedded content items of the collection.

At step 1120, client device 240 can send the selected content item identifiers to collections server 202. For example, CMS client 250 can send a message to collections module 204 indicating a selected content item identifier and a collections attribute (e.g., header background image, a logo image, and/or one or more embedded content items) with which the content item identifier is associated.

At step 1122, collections server 202 can generate a collection item identifier for the selected content item identifier. For example, in response to receiving the content item identifier, collections module 204 can generate a collection item identifier for the selected content item identifier that can be embedded in the collection and used to reference the selected content item, as described above.

At step 1124, collections server 202 can generate a content item identifier to collection item identifier mapping. For example, collections module 204 can create an entry (e.g., record) in collection items 210 (e.g., a database table) in collections storage database 206 and store content item identifier, collection item identifier, collection identifier for the new collection, and additional collection item attributes, as described above, in the collection items entry.

At step 1126, collections server 202 can embed the selected content item in the collection using the collection item identifier. For example, collections module 204 can generate a new version of the collection (e.g., a web page) that includes links (e.g., URLs) that reference the collection item identifier. The collection item identifier can be used to generate links for the header background image, a logo image, and/or one or more embedded content items.

At step 1128, collection server 202 can send the collection with the embedded content to client device 240. For example, collections module 204 can send the collection having the embedded collection item identifiers to CMS client 250. CMS client 250 can then present the collection, as described below with respect to process 1200.

Figure 11B:
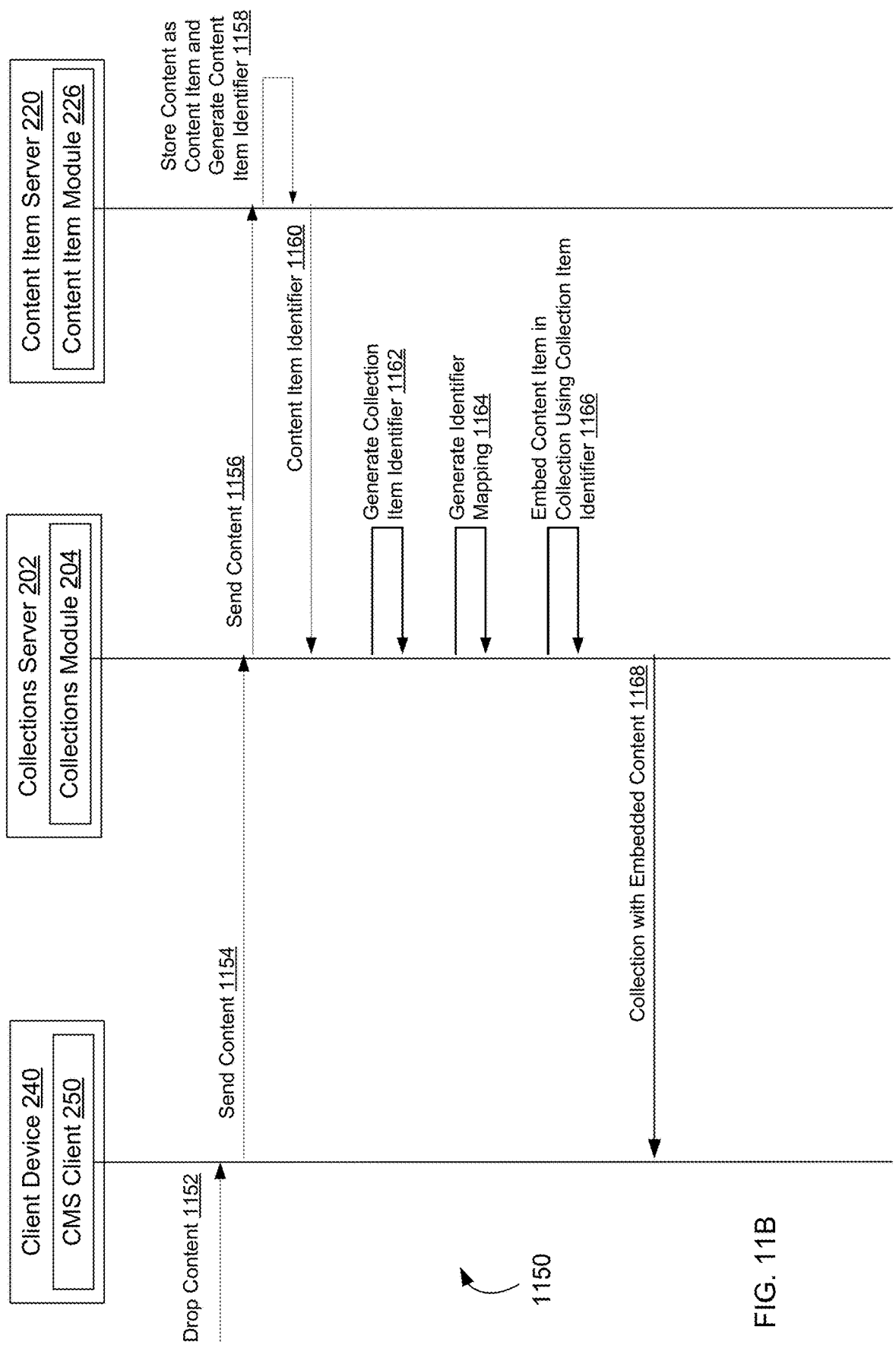
FIG. 11B shows a flow diagram of an example process for adding a content item to a collection.

FIG. 11B shows a flow diagram of an example process 1150 for adding a content item to a collection. For example, process 1150 can be performed cooperatively by collections server 202, content item server 220, and client device 240 to create a new collection. Process 1150 can be performed when a private, editable view of a collection (e.g., a new collection, a selected collection, etc.) is being presented by CMS client 250 on a display of client device 240.

At step 1152, client device 240 can receive user input identifying a content item to add to the collection. For example, the user input can be a drag-and-drop input where the user drags a representation of a content item from a storage location onto the collection currently presented by CMS client 250.

At step 1154, client device 240 can send a request to collections server 202 to add the identified content item to the currently presented collection. For example, the request can include the collection identifier for the collection and the identified content item.

At step 1156, collections server 202 can send the content item to content item server 220 for storage. For example, collections module 204 can send the collection identifier and content item to content item module 226.

At step 1158, content item server 220 can store the content item in a storage location in content storage 160 associated with the identified collection. For example, content item module 226 can generate a content item identifier for the new content item and store the content item in a folder (e.g., shared folder) associated with the content item.

At step 1160, content item server 220 can send the content item identifier to collections server 202. For example, content item module 226 can send the content item identifier to collections module 204.

At step 1162, collections server 202 can generate a collection item identifier for the selected content item identifier. For example, in response to receiving the content item identifier, collections module 204 can generate a collection item identifier for the selected content item identifier that can be embedded in the collection and used to reference the selected content item, as described above.

At step 1164, collections server 202 can generate a content item identifier to collection item identifier mapping. For example, collections module 204 can create an entry (e.g., record) in collection items 210 (e.g., a database table) in collections storage database 206 and store content item identifier, collection item identifier, collection identifier for the new collection, and additional collection item attributes, as described above, in the collection items entry.

At step 1166, collections server 202 can embed the selected content item in the collection using the collection item identifier. For example, collections module 204 can generate a new version of the collection (e.g., a web page) that includes links (e.g., URLs) that reference the collection item identifier. The collection item identifier can be used to generate links for the header background image, a logo image, and/or one or more embedded content items.

At step 1168, collection server 202 can send the collection with the embedded content to client device 240. For example, collections module 204 can send the collection having the embedded collection item identifiers to CMS client 250. CMS client 250 can then present the collection, as described below with respect to process 1200.

Figure 12:
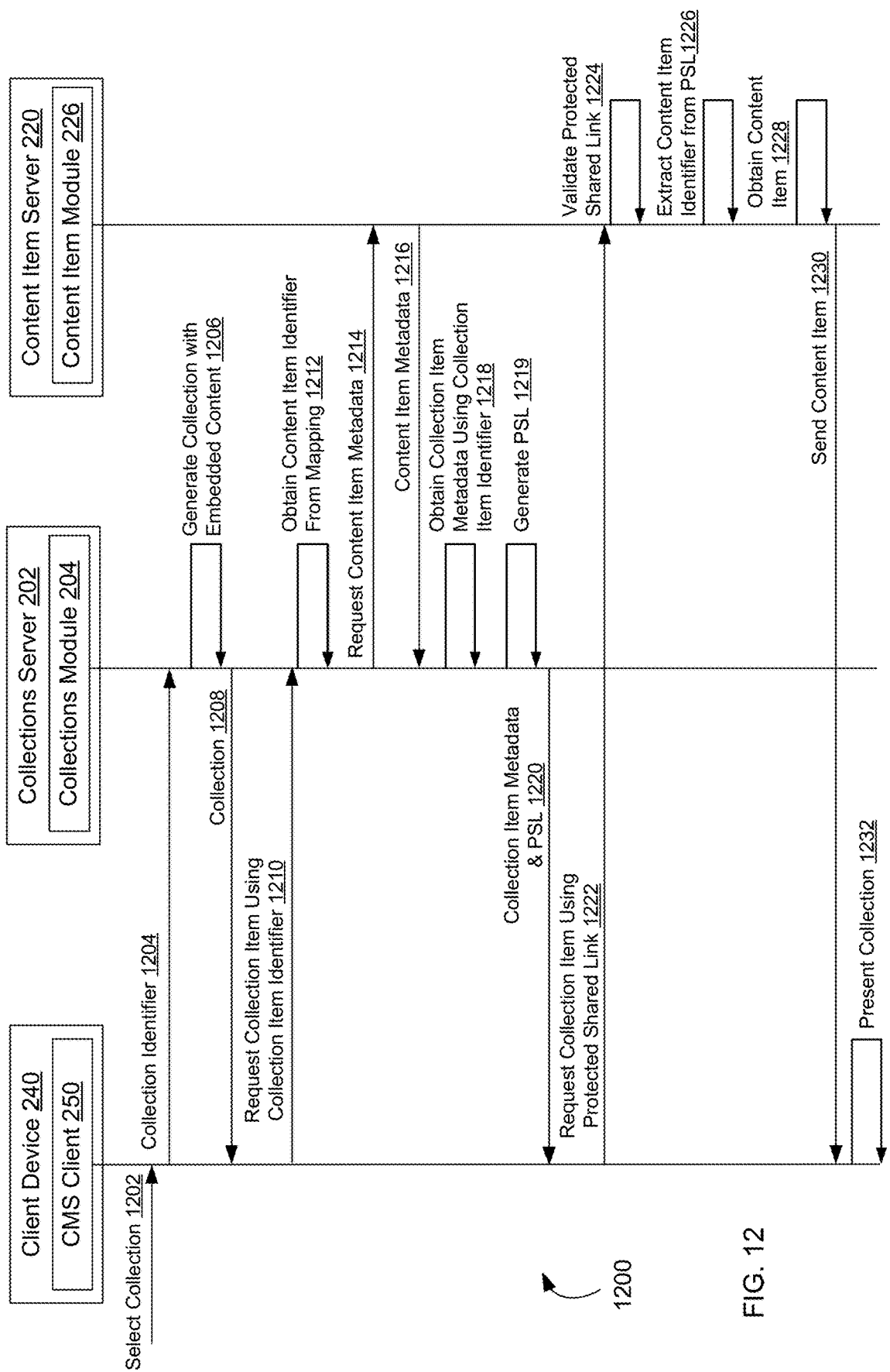
FIG. 12 shows a flow diagram of an example process for presenting a collection.

FIG. 12 shows a flow diagram of an example process 1200 for presenting a collection. For example, process 12000 can be performed cooperatively by collections server 202, content item server 220, and client device 240 to present a collection on client device 240.

At step 1202, client device 240 can receive user input selecting a collection. For example, CMS client 250 can receive user input selecting a collection from the collections listed on GUI 300 of FIG. 3, as described above. Alternatively, the selected collection can correspond to a new collection that has been modified to add content and where the graphical user interface presenting the collection needs to be updated.

At step 1204, client device 240 can send the collection identifier for the selected collection to collections server 202. For example, when the user selects a collection, CMS client 250 can determine the collection identifier for the collection and send the collection identifier to collections module 204.

At step 1206, collections server 202 can generate a collection with embedded content. For example, collections module 204 can generate the collection by using the collection identifier to obtain collections data (e.g., attributes, images, text, collection item identifiers, etc.) from collections storage 206. For example, collections module 204 can use the collection identifier to obtain header information (e.g., header background image, logo image, title, introduction, etc.) from collections data 208. Collections module 204 can use the collection identifier to obtain collection item information (e.g., collection item identifiers, comment identifiers, etc.) from collection items 210. Collections module 204 can use the comment identifiers obtained from collection items 210 to obtain comments and/or comments threads for each collection item (e.g., tiles, embedded content items, etc.) from comments 212. Collections module 204 can combine all of this collection information into a data structure (e.g., web page, collection object, etc.) to generate the collection.

At step 1208, collections server 202 can send the collection to client device 240. For example, collections module 204 can send the collection data structure generated at step 1206 to CMS client 250.

At step 1210, client device 250 can request a collection item using the collection item identifiers. For example, to obtain and present the content items and/or content item metadata corresponding to the header background image, logo image, and tiles, CMS client 250 can send the collection item identifiers for each of these collection attributes to collections module 204 on collections server 202 in a request for the corresponding content items.

At step 1212, collections server 202 can obtain a content item identifier corresponding to a collection item identifier from the content item identifier corresponding to collection item identifier mapping managed by collections module 204. For example, in response to receiving a collection item identifier, collections module 204 can obtain the content item identifier corresponding to the received collection identifier from collection items 210.

At step 1214, collections server 202 can request content item metadata from content item server 220. For example, collections module 204 can use the content item identifier obtained at step 1216 to request content item metadata corresponding to the content item identifier from content item module 226 on content item server 220. The request can include parameters specifying which content item metadata should be included or excluded from the content item metadata returned to collections module 204. For example, the parameters can specify that the content item name, the content item type, the content item size, etc., should be included in the content item metadata. The parameters can specify that comments, edits, revisions, annotations, etc., should be excluded from the content item metadata. In some implementations, all available content item metadata can be included in the content item metadata returned to collections module 204.

At step 1216, content item server 220 can send the content item metadata to collections server 202. For example, if collections module 204 receives a content item metadata that includes all of the metadata for the identified content item, then collections module 204 can filter the content item metadata to remove comments, edits, revisions, annotations, etc., in the content item metadata so that these types of metadata are not delivered to client device 240.

At step 1218, collections server 202 can obtain collection item metadata using the collection item identifier received at step 1210. For example, collections module 204 can obtain collection item metadata, such as a caption, comments, etc., corresponding to the collection item identifier from collection items 210 and comments 212 in collections storage 206. Collections module 204 can add the content item metadata to the collections item metadata and send the collections item metadata to CMS client 250 at step 1220 below.

At step 1219, collections server 202 can generate a protected shared link for obtaining a content item from content item server 220. As described above, the protected shared link (PSL) can be a URL associated with content item module 226 that includes an encrypted payload. The payload can include a URL that includes the content item identifier corresponding to the content item, the collection identifier for the requested collection, a creation time corresponding to the time when the PSL was generated, and a time to live indicating a duration of time during which the PSL is valid. The payload can be encrypted using a shared secret that is shared between content item module 226 and collections module 204.

At step 1220, collections server 202 can send the collection item metadata and the PSL for the content item to client device 240. For example, collections module 204 can send the collection item metadata and the PSL for the content item to CMS client 250.

At step 1222, client device 240 can request a collection item from content item server 220 using the protected shared link. For example, CMS client 250 can send a request for a content item corresponding to the collection item to content item module 226 on content item server 220. The request can include the encrypted payload received from collections module 204.

At step 1224, content item server 220 can validate the protected shared link. For example, content item module 226 can validate the protected shared link by attempting to decrypt the encrypted payload using the shared secret shared between collections server 202 and content item server 220. If content item module 226 can decrypt the encrypted payload, then content item module 226 can determine that the encrypted payload is a valid payload generated by collections module 204. After decrypting the payload, content item module 226 can validate the protected shared link by determining that the time when the PSL was received is within the time window specified by the creation time and time to live duration indicated in the payload. If content item module 226 cannot validate the payload, then process 1200 can terminate and content item module 226 can return an error message to CMS client 250. If content item module 226 can validate the payload, then process 1200 can continue to step 1226.

At step 1226, content item server 220 can extract a content item identifier from the protected shared link. For example, content item module 226 can obtain the content item identifier from the decrypted PSL payload.

At step 1228, content item server 220 can obtain the content item corresponding to the content item identifier. For example, content item module 226 can obtain the content item corresponding to the content item identifier from content storage 160. In some implementations, content item module 226 can generate an image representing the content item. For example, content item module can generate a tile image (e.g., thumbnail image) representing the content item. Content item module can generate a full preview image representing the content item.

At step 1230, content item server 220 can send the content item to client device 240. For example, content item module 226 can send the content item or image of the content item to CMS client 250.

At step 1232, client device 240 can present the collection. For example, after CMS client 250 receives the content items corresponding to the collection selected at step 1202, CMS client 250 can present the collection on a display of client device 240. For example, CMS client 250 can present the collection on a graphical user interface, as described with reference to FIG. 6, FIG. 7, and FIG. 10 above.

Figure 13:
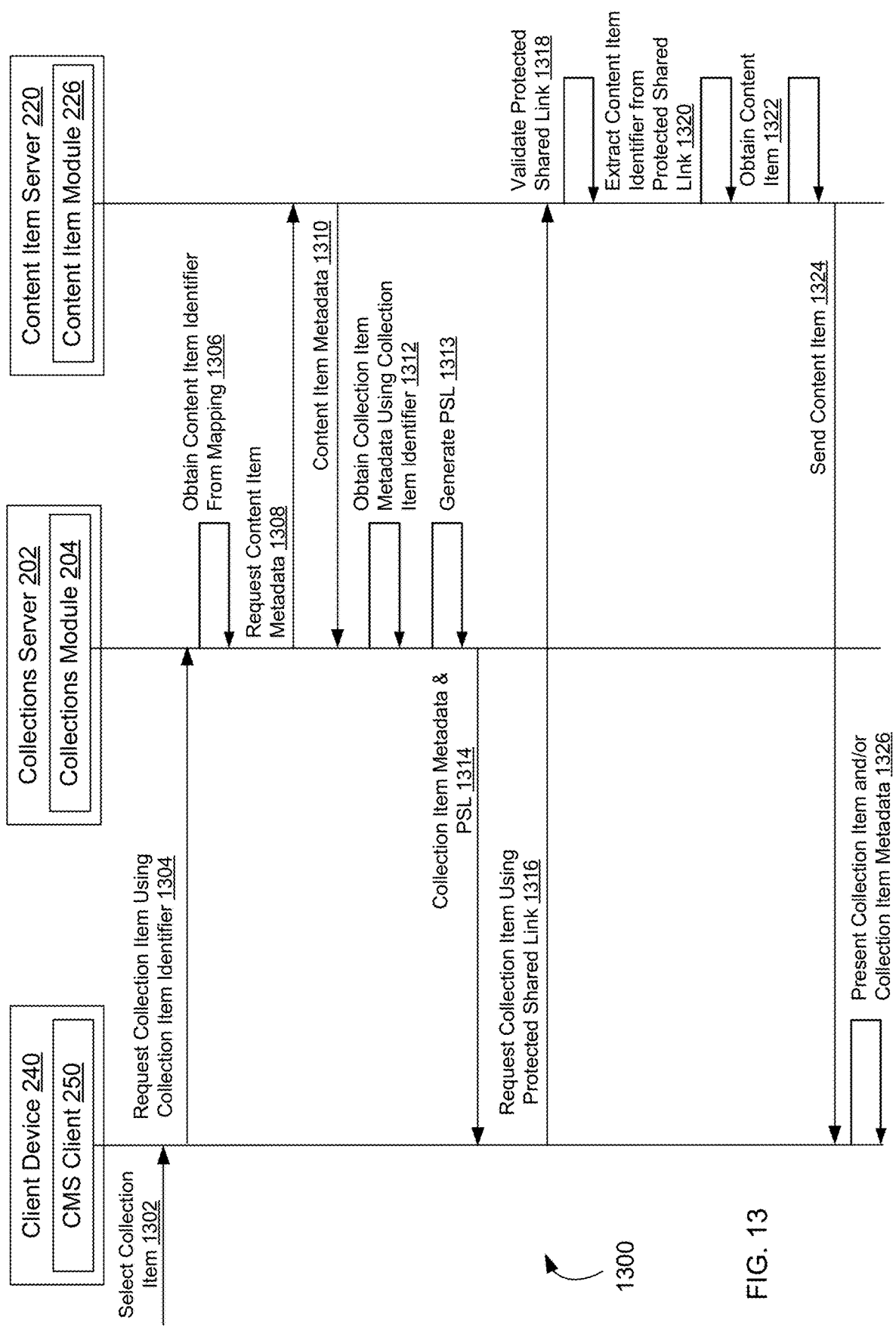
FIG. 13 shows a flow diagram of an example process for presenting a collection item preview.

FIG. 13 shows a flow diagram of an example process 1300 for presenting a collection item preview. For example, process 1300 can be performed cooperatively by collections server 202, content item server 220, and client device 240 to present a collection item preview on client device 240.

At step 1302, client device 240 can receive user input selecting a collection item. For example, CMS client 250 can receive user input selecting a collection item from a collection presented by CMS client 250. For example, the user can select graphical element 720 associated with a collection item tile, as described above with reference to FIG. 7.

At step 1304, client device 240 can send the collection item identifier for the selected collection item to collections server 202. For example, in response to receiving the input selecting graphical element 720 associated with a collection item tile, CMS client 250 can send the collection item identifier corresponding to the collection item tile to collections module 204 in a request for a full preview of the content item corresponding to the collection item.

At step 1306, collections server 202 can obtain a content item identifier corresponding to a collection item identifier from the content item identifier corresponding to collection item identifier mapping managed by collections module 204.

For example, in response to receiving a collection item identifier, collections module 204 can obtain the content item identifier corresponding to the received collection identifier from collection items 210.

At step 1308, collections server 202 can request content item metadata from content item server 220. For example, collections module 204 can use the content item identifier obtained at step 1306 to request content item metadata corresponding to the content item identifier from content item module 226 on content item server 220. The request can include parameters specifying which content item metadata should be included or excluded from the content item metadata returned to collections module 204. For example, the parameters can specify that the content item name, the content item type, the content item size, etc., should be included in the content item metadata. The parameters can specify that comments, edits, revisions, annotations, etc., should be excluded from the content item metadata. In some implementations, all available content item metadata can be included in the content item metadata returned to collections module 204.

At step 1310, content item server 220 can send the content item metadata to collections server 202. For example, if collections module 204 receives a content item metadata that includes all of the metadata for the identified content item, then collections module 204 can filter the content item metadata to remove comments, edits, revisions, annotations, etc., in the content item metadata so that these types of content item metadata are not delivered to client device 240.

At step 1312, collections server 202 can obtain collection item metadata using the collection item identifier received at step 1304. For example, collections module 204 can obtain collection item metadata, such as a caption, comments, etc., corresponding to the collection item identifier from collection items 210 and comments 212 in collections storage 206. Collections module 204 can add the content item metadata to the collections item metadata and send the collections item metadata to CMS client 250 at step 1314 below.

At step 1313, collections server 202 can generate a protected shared link for obtaining a content item from content item server 220. As described above, the protected shared link (PSL) can be a URL associated with content item module 226 that includes an encrypted payload. The payload can include a URL that includes the content item identifier corresponding to the content item, the collection identifier for the requested collection, a creation time corresponding to the time when the PSL was generated, and a time to live indicating a duration of time during which the PSL is valid starting at the creation time. The payload can be encrypted using a shared secret that is shared between content item module 226 and collections module 204.

At step 1314, collections server 202 can send the collection item metadata and the PSL for the content item to client device 240. For example, collections module 204 can send the collection item metadata and the PSL for the content item to CMS client 250.

At step 1316, client device 240 can request a collection item from content item server 220 using the protected shared link. For example, CMS client 250 can send a request for a content item corresponding to the collection item to content item module 226 on content item server 220. The request can include the encrypted payload received from collections module 204.

At step 1318, content item server 220 can validate the protected shared link. For example, content item module 226 can validate the protected shared link by attempting to decrypt the encrypted payload using the shared secret shared between collections server 202 and content item server 220. If content item module 226 can decrypt the encrypted payload, then content item module 226 can determine that the encrypted payload is a valid payload generated by collections module 204. After decrypting the payload, content item module 226 can validate the protected shared link by determining that the time when the PSL was received is within the time window specified by the creation time and time to live duration indicated in the payload. If content item module 226 cannot validate the payload, then process 1200 can terminate and content item module 226 can return an error message to CMS client 250. If content item module 226 can validate the payload, then process 1300 can continue to step 1320.

At step 1320, content item server 220 can extract a content item identifier from the protected shared link. For example, content item module 226 can obtain the content item identifier from the decrypted PSL payload.

At step 1322, content item server 220 can obtain the content item corresponding to the content item identifier. For example, content item module 226 can obtain the content item corresponding to the content item identifier from content storage 160. In some implementations, content item module 226 can generate an image representing the content item. For example, content item module can generate a full preview image representing the content item.

At step 1324, content item server 220 can send the content item to client device 240. For example, content item module 226 can send the content item or image of the content item to CMS client 250.

At step 1232, client device 240 can present the collection item and/or collection item metadata. For example, after CMS client 250 receives the content item corresponding to the collection selected at step 1302, CMS client 250 can present the collection item on a display of client device 240. For example, CMS client 250 can present the collection item (e.g., a full preview of the corresponding content item) on a graphical user interface, as described with reference to FIG. 8 and FIG. 9 above.

FIG. 14 shows a flow diagram of an example process 1400 for presenting collection item metadata. For example, process 1400 can be performed cooperatively by collections server 202, content item server 220, and client device 240 to present a collection item metadata on client device 240. For example, process 1400 can be performed to obtain collection item comment to be presented in graphical element 1012 of FIG. 10.

At step 1402, client device 240 can receive user input selecting a collection item. For example, CMS client 250 can receive user input selecting a collection item from a collection presented by CMS client 250. For example, the user can select graphical element 718 associated with a collection item tile, as described above with reference to FIG. 7 and FIG. 10.

At step 1404, client device 240 can send the collection item identifier for the selected collection item to collections server 202. For example, in response to receiving the input selecting graphical element 718 associated with a collection item tile, CMS client 250 can send the collection item identifier corresponding to the collection item tile to collections module 204 in a request for metadata associated with the collection item identifier.

At step 1406, collections server 202 can obtain a content item identifier corresponding to a collection item identifier from the content item identifier corresponding to collection item identifier mapping managed by collections module 204. For example, in response to receiving a collection item identifier, collections module 204 can obtain the content item identifier corresponding to the received collection identifier from collection items 210.

At step 1408, collections server 202 can request content item metadata from content item server 220. For example, collections module 204 can use the content item identifier obtained at step 1406 to request content item metadata corresponding to the content item identifier from content item module 226 on content item server 220. The request can include parameters specifying which content item metadata should be included or excluded from the content item metadata returned to collections module 204. For example, the parameters can specify that the content item name, the content item type, the content item size, etc., should be included in the content item metadata. The parameters can specify that comments, edits, revisions, annotations, etc., should be excluded from the content item metadata. In some implementations, all available content item metadata can be included in the content item metadata returned to collections module 204.

At step 1410, content item server 220 can send the content item metadata to collections server 202. For example, if collections module 204 receives a content item metadata that includes all of the metadata for the identified content item, then collections module 204 can filter the content item metadata to remove comments, edits, revisions, annotations, etc., in the content item metadata so that these types of content item metadata are not delivered to client device 240.

At step 1412, collections server 202 can obtain collection item metadata using the collection item identifier received at step 1404. For example, collections module 204 can obtain collection item metadata, such as a caption, comments, etc., corresponding to the collection item identifier from collection items 210 and comments 212 in collections storage 206. Collections module 204 can add the content item metadata to the collections item metadata and send the collections item metadata to CMS client 250 at step 1414 below.

At step 1414, collections server 202 can send the collection item metadata for the content item to client device 240. For example, collections module 204 can send the collection item metadata for the content item to CMS client 250.

At step 1416, client device 240 can present the collection item metadata. For example, after CMS client 250 receives the content item corresponding to the collection selected at step 1402, CMS client 250 can present the collection item metadata on a display of client device 240. For example, CMS client 250 can present the collection item metadata (e.g., collection item comments) on graphical element 1012, as described with reference to FIG. 10 above.

Figure 15A:
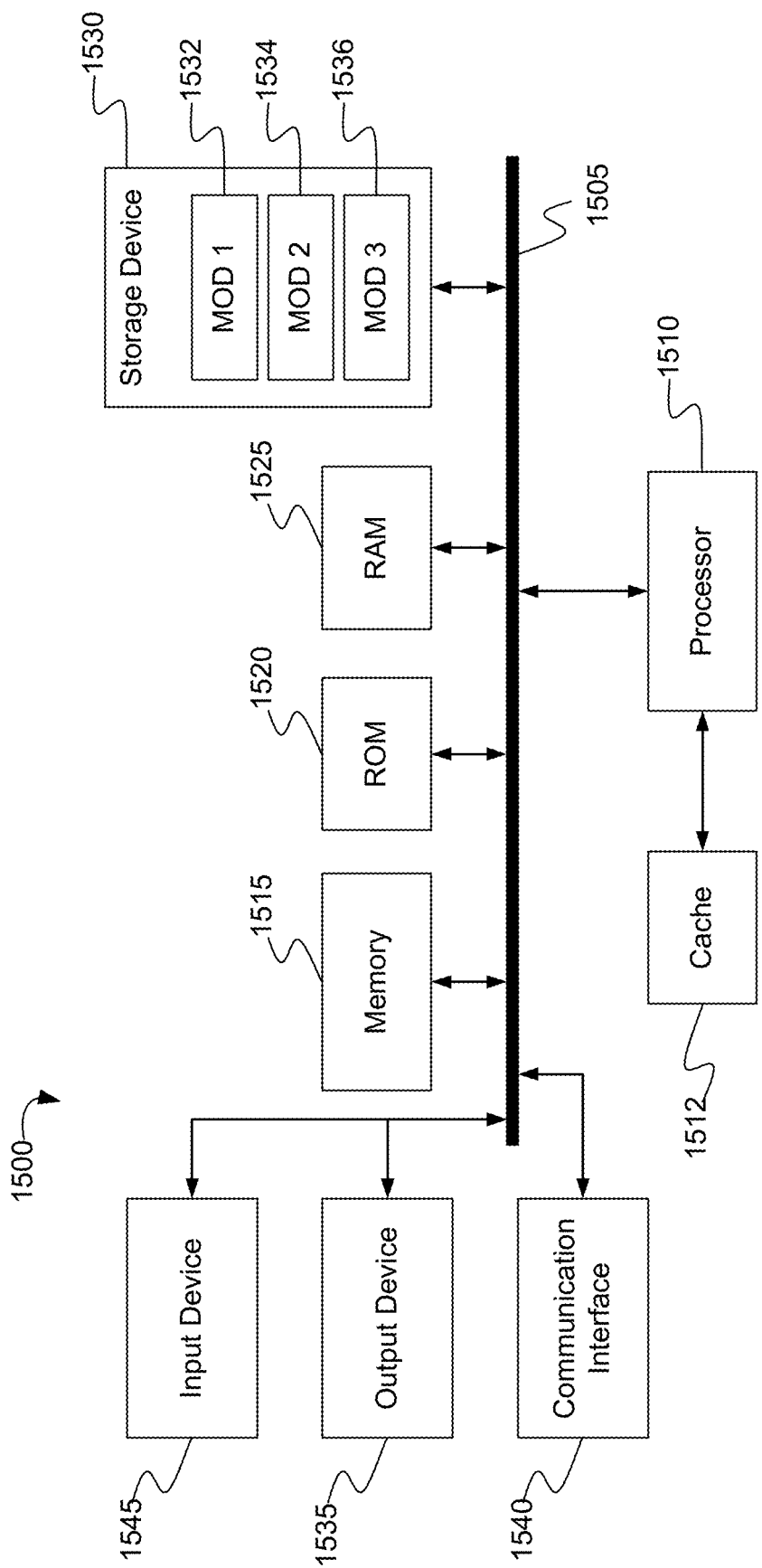
FIG. 15A shows an example possible system embodiment for implementing various embodiments of the present technology.
Figure 15B:
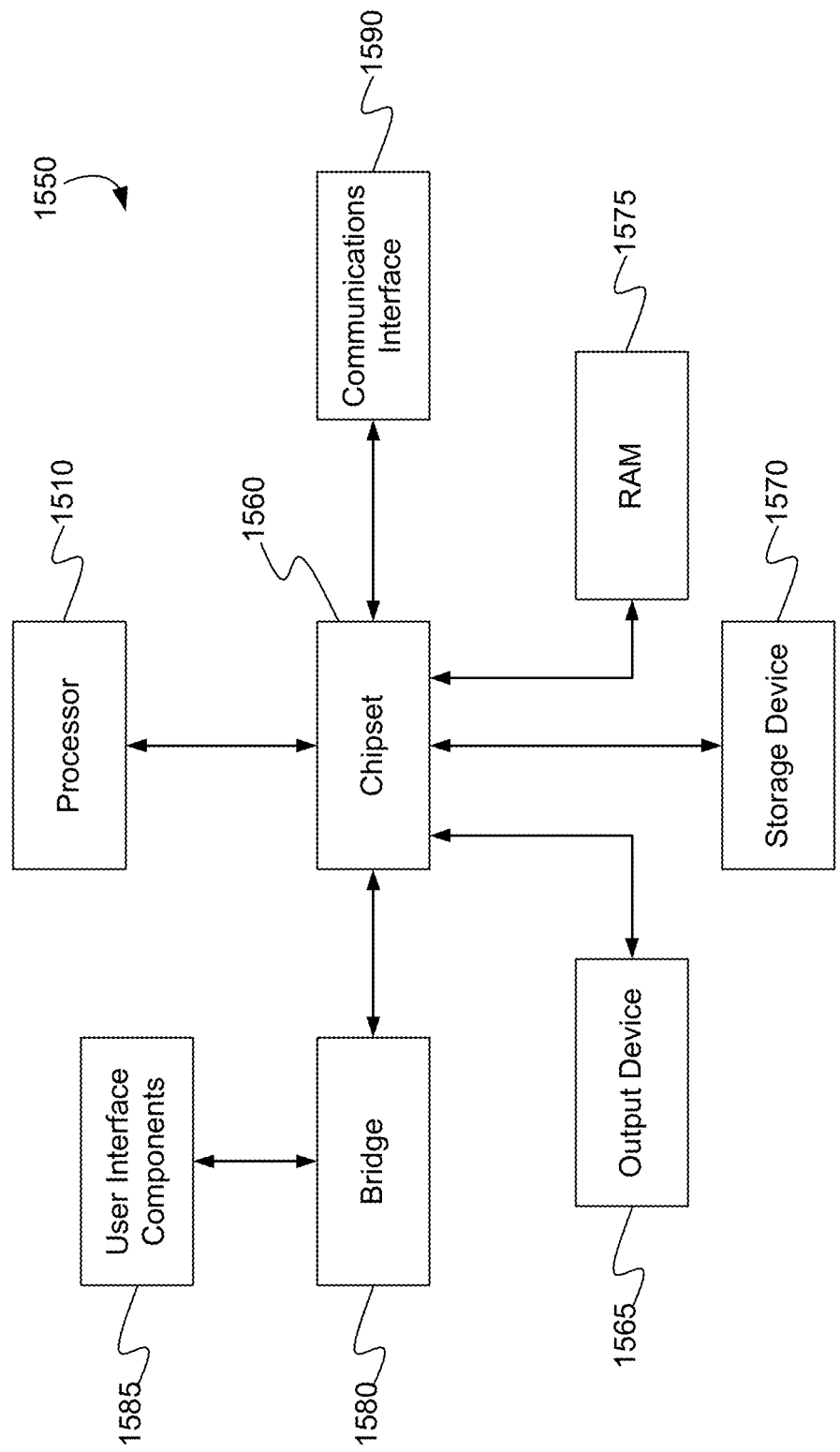
FIG. 15B shows an example possible system embodiment for implementing various embodiments of the present technology.

FIG. 15A and FIG. 15B show example possible system embodiments. The more appropriate embodiment will be apparent to those of ordinary skill in the art when practicing the present technology. Persons of ordinary skill in the art will also readily appreciate that other system embodiments are possible.

FIG. 15A illustrates a conventional system bus computing system architecture 1500 wherein the components of the system are in electrical communication with each other using a bus 1505. Example system 1500 includes a processing unit (CPU or processor) 1510 and a system bus 1505 that couples various system components including the system memory 1515, such as read only memory (ROM) 1520 and random access memory (RAM) 1525, to the processor 1510. The system 1500 can include a cache of high-speed memory connected directly with, in close proximity to, or integrated as part of the processor 1510. The system 1500 can copy data from the memory 1515 and/or the storage device 1530 to the cache 1512 for quick access by the processor 1510. In this way, the cache can provide a performance boost that avoids processor 1510 delays while waiting for data. These and other modules can control or be configured to control the processor 1510 to perform various actions. Other system memory 1515 may be available for use as well. The memory 1515 can include multiple different types of memory with different performance characteristics. The processor 1510 can include any general purpose processor and a hardware module or software module, such as module 1 1532, module 2 1534, and module 3 1536 stored in storage device 1530, configured to control the processor 1510 as well as a special-purpose processor where software instructions are incorporated into the actual processor design. The processor 1510 may essentially be a completely self-contained computing system, containing multiple cores or processors, a bus, memory controller, cache, etc. A multi-core processor may be symmetric or asymmetric.

To enable user interaction with the computing device 1500, an input device 1545 can represent any number of input mechanisms, such as a microphone for speech, a touch-sensitive screen for gesture or graphical input, keyboard, mouse, motion input, speech and so forth. An output device 1535 can also be one or more of a number of output mechanisms known to those of skill in the art. In some instances, multimodal systems can enable a user to provide multiple types of input to communicate with the computing device 1500. The communications interface 1540 can generally govern and manage the user input and system output. There is no restriction on operating on any particular hardware arrangement and therefore the basic features here may easily be substituted for improved hardware or firmware arrangements as they are developed.

Storage device 1530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1525, read only memory (ROM) 1520, and hybrids thereof.

The storage device 1530 can include software modules 1532, 1534, 1536 for controlling the processor 1510. Other hardware or software modules are contemplated. The storage device 1530 can be connected to the system bus 1505. In one aspect, a hardware module that performs a particular function can include the software component stored in a computer-readable medium in connection with the necessary hardware components, such as the processor 1510, bus 1505, display 1535, and so forth, to carry out the function.

FIG. 15B illustrates a computer system 1550 having a chipset architecture that can be used in executing the described method and generating and displaying a graphical user interface (GUI). Computer system 1550 is an example of computer hardware, software, and firmware that can be used to implement the disclosed technology. System 1550 can include a processor 1510, representative of any number of physically and/or logically distinct resources capable of executing software, firmware, and hardware configured to perform identified computations. Processor 1510 can communicate with a chipset 1560 that can control input to and output from processor 1510. In this example, chipset 1560 outputs information to output 1565, such as a display, and can read and write information to storage device 1570, which can include magnetic media, and solid state media, for example. Chipset 1560 can also read data from and write data to RAM 1575. A bridge 1580 for interfacing with a variety of user interface components 1585 can be provided for interfacing with chipset 1560. Such user interface components 1585 can include a keyboard, a microphone, touch detection and processing circuitry, a pointing device, such as a mouse, and so on. In general, inputs to system 1550 can come from any of a variety of sources, machine generated and/or human generated.

Chipset 1560 can also interface with one or more communication interfaces 1590 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 1510 analyzing data stored in storage 1570 or 1575. Further, the machine can receive inputs from a user via user interface components 1585 and execute appropriate functions, such as browsing functions by interpreting these inputs using processor 1510.

It can be appreciated that example systems 1500 and 1550 can have more than one processor 1510 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software modules, alone or in combination with other devices. In an embodiment, a software module can be software that resides in memory of a client device and/or one or more servers of a content management system and perform one or more functions when a processor executes the software associated with the module. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method, comprising:

receiving, at a content management system, a first request to generate a content item collection;

generating, by the content management system, the content item collection comprising a plurality of tiles, each tile of the plurality of tiles corresponding to a content item stored by the content management system;

generating, by the content management system, a collection item identifier that uniquely identifies the content item collection;

sending, by the content management system, the collection item identifier and the content item collection comprising the plurality of tiles to a client device for display, wherein each tile of the plurality of tiles comprises is associated with a respective graphical element defining one or more tile formatting options for a respective tile of the plurality of tiles;

receiving, at the content management system, a second request selecting a first content item to insert in a first tile of the content item collection, the second request comprising the first content item, the collection item identifier, and a tile formatting option for the first tile based on user interaction with a first graphical element dedicated to the first tile, the first graphical element defining the one or more tile formatting options for the first tile, the tile formatting option defining how the first content item and metadata associated with the first content item are to be displayed;

upon receiving the second request, generating, by the content management system, a content item identifier and a link to the first content item;

associating, by the content management system, the content item identifier with the collection item identifier;

generating, by the content management system, an updated content item collection comprising at least the first tile and the link to the first content item in accordance with the tile formatting option; and sending, by the content management system, the updated content item collection to the client device for display.

2. The method of claim 1, wherein generating, by the content management system, the content item collection comprising the plurality of tiles comprises:
generating an empty content item collection comprising one or more empty tiles, each empty tile serving as a placeholder for each tile.

3. The method of claim 2, wherein sending, by the content management system, the content item collection comprising the plurality of tiles to the client device for display, comprise:
sending to the client device for display the empty content item collection.

4. The method of claim 1, wherein receiving, at the content management system, the second request selecting the first content item to insert in the first tile of the content item collection, comprises:
receiving the first content item and a content item identifier corresponding to the first content item from the client device.

5. The method of claim 1, wherein sending, by the content management system, the content item collection comprising the plurality of tiles to the client device for display, comprises:
determining, by the content management system, a privilege level of a user of the client device; and
upon determining, by the content management system, that the privilege level of the user of the client device is a first privilege level, including a private view of the content item collection.

6. The method of claim 1, further comprising:
receiving, by the content management system, a third request to preview at least a portion of the first content item, the third request comprising the collection item identifier and the link;
generating, by the content management system, a preview image of at least the portion of the first content item, the preview image comprising content of the first content item; and
sending, by the content management system, the preview image of at least the portion of the first content item to the client device for display.

7. The method of claim 1, further comprising:
receiving, at the content management system, layout information specifying a location of the first tile within the content item collection.

8. The method of claim 6, wherein generating, by the content management system, the preview image of at least a portion of the first content item, comprises:
generating a full preview of the first content item, the full preview a manipulable representation of the first content item.

9. A method comprising:
receiving, at a client device, a first user input corresponding to a request to generate a content item collection;
sending, by the client device, the request for the content item collection to a collections server;
receiving, at the client device from the collections server, the content item collection comprising a plurality of tiles, each tile of the plurality of tiles corresponding to a content item stored by a content management system and a collection item identifier that uniquely identifies the content item collection, wherein each tile of the plurality of tiles is associated with a respective graphical element defining one or more tile formatting options for a respective tile of the plurality of tiles;
generating, by the client device, a first graphical user interface for presenting the content item collection comprising the plurality of tiles, wherein each tile of the plurality of tiles includes a respective graphical element defining the one or more tile formatting options for the respective tile;
receiving, at the client device via the first graphical user interface, a second user input corresponding to a request to add a first content item to a first tile of the plurality of tiles, the request comprising a tile formatting option for the first tile based on user interaction with a first graphical element dedicated to the first tile, the first graphical element defining the one or more tile formatting options for the first tile, the tile formatting option defining how the first content item and metadata associated with the first content item are to be displayed;
sending, by the client device, the request to add the first content item to the first tile to the content management system, the request comprising the first content item and the collection item identifier;
receiving, by the client device from the content management system, an updated content item collection comprising a preview image of at least a portion of the first content item and the first tile of the plurality of tiles, wherein the first content item is associated with the collection item identifier at the content management system; and
generating, by the client device, a second graphical user interface for presenting the updated content item collection, the second graphical user interface comprising the preview image positioned in the first tile.

10. The method of claim 9, wherein receiving, at the client device via the first graphical user interface, the second user input corresponding to the request to add the first content item to the first tile of the plurality of tiles, comprises:
receiving a drag-and-drop input in which a user drags a representation of the first content item from a storage location onto the first tile of the plurality of tiles.

11. The method of claim 9, wherein each tile of the plurality of tiles comprises a graphical element actionable for adding a content item therein.

12. The method of claim 9, wherein sending, by the client device, the request to add the first content item to the first tile to the content management system, comprises:
identifying a content item identifier corresponding to the first content item; and
sending the content item identifier to the content management system.

13. The method of claim 12, wherein receiving, by the client device from the content management system, the updated content item collection comprising the preview image of at least the portion of the first content item and the first tile of the plurality of tiles, comprises:
receiving a protected shared link corresponding to the first content item.

14. The method of claim 12, further comprising:
sending a request for metadata associated with the first content item using the content item identifier.

15. The method of claim 9, wherein receiving, at the client device via the first graphical user interface, the second user input corresponding to the request to add the first content item to the first tile of the plurality of tiles, comprises:
receiving a third input selecting the first tile of the plurality of tiles;
generating a graphical element displaying one or more selectable content item options; and
receiving a fourth input selecting the first content item from the one or more selectable content item options.

16. A non-transitory computer readable medium storing instructions, which, when executed by one or more processors, cause the one or more processors to perform operations, comprising:
- receiving a first user input corresponding to a request to generate a content item collection;
- sending the request for the content item collection to a collections server;
- receiving, from a content management system, the content item collection comprising a plurality of tiles, each tile of the plurality of tiles corresponding to a content item stored by the content management system and a collection item identifier that uniquely identifies the content item collection, wherein each tile of the plurality of tiles is associated with a respective graphical element defining one or more tile formatting options for a respective tile of the plurality of tiles;
- generating a first graphical user interface for presenting the content item collection comprising the plurality of tiles, wherein each tile of the plurality of tiles includes a respective graphical element defining the one or more tile formatting options for the respective tile;
- receiving, via the first graphical user interface, a second user input corresponding to a request to add a first content item to a first tile of the plurality of tiles, the request comprising a tile formatting option for the first tile based on user interaction with a first graphical element dedicated to the first tile, the first graphical element defining the one or more tile formatting options for the first tile, the tile formatting option defining how the first content item and metadata associated with the first content item are to be displayed;
- the request to add the first content item to the first tile to the content management system, the request comprising the first content item and the collection item identifier;
- receiving, from the content management system, an updated content item collection comprising a preview image of at least a portion of the first content item and the first tile of the plurality of tiles, wherein the first content item is associated with the collection item identifier at the content management system; and
- generating a second graphical user interface for presenting the updated content item collection, the second graphical user interface comprising the preview image positioned in the first tile.

17. The non-transitory computer readable medium of claim 16, wherein receiving, via the first graphical user interface, the second user input corresponding to the request to add the first content item to the first tile of the plurality of tiles, comprises:
- receiving a drag-and-drop input in which a user drags a representation of the first content item from a storage location onto the first tile of the plurality of tiles.

18. The non-transitory computer readable medium of claim 16 wherein each tile of the plurality of tiles comprises a graphical element actionable for adding a content item therein.

19. The non-transitory computer readable medium of claim 16, wherein sending the request to add the first content item to the first tile to the content management system, comprises:
- identifying a content item identifier corresponding to the first content item; and
- sending the content item identifier to the content management system.

20. The non-transitory computer readable medium of claim 19, wherein receiving, from the content management system, the updated content item collection comprising the preview image of at least the portion of the first content item and the first tile of the plurality of tiles, comprises:
- receiving a protected shared link corresponding to the first content item.

21. The non-transitory computer readable medium of claim 19, further comprising:
- sending a request for metadata associated with the first content item using the content item identifier.

* * * * *